(12) United States Patent
Ichikawa et al.

(10) Patent No.: US 11,118,022 B2
(45) Date of Patent: Sep. 14, 2021

(54) SIZING AGENT COATED CARBON FIBER, METHOD FOR PRODUCING SIZING AGENT COATED CARBON FIBER, CARBON FIBER REINFORCED COMPOSITE MATERIAL, AND METHOD FOR PRODUCING CARBON FIBER REINFORCED COMPOSITE MATERIAL

(71) Applicant: TORAY INDUSTRIES, INC., Tokyo (JP)

(72) Inventors: Tomoko Ichikawa, Ehime (JP); Kazuki Yoshihiro, Ehime (JP); Hisafumi Mizuta, Ehime (JP); Makoto Endo, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 91 days.

(21) Appl. No.: 15/528,711

(22) PCT Filed: Jan. 13, 2016

(86) PCT No.: PCT/JP2016/050776
§ 371 (c)(1),
(2) Date: May 22, 2017

(87) PCT Pub. No.: WO2016/143371
PCT Pub. Date: Sep. 15, 2016

(65) Prior Publication Data
US 2018/0346668 A1    Dec. 6, 2018

(30) Foreign Application Priority Data

Mar. 6, 2015   (JP) .............................. JP2015-044435
Mar. 9, 2015   (JP) .............................. JP2015-045599
Oct. 6, 2015   (JP) .............................. JP2015-198219

(51) Int. Cl.
   B32B 5/02        (2006.01)
   B32B 27/12       (2006.01)
   (Continued)

(52) U.S. Cl.
   CPC ................. *C08J 5/06* (2013.01); *B32B 5/022* (2013.01); *B32B 5/024* (2013.01); *B32B 27/12* (2013.01);
   (Continued)

(58) Field of Classification Search
   CPC ......... B32B 5/022; B32B 5/024; B32B 27/12; B32B 37/10; B32B 2260/023;
   (Continued)

(56) References Cited

U.S. PATENT DOCUMENTS

2007/0172617 A1* 7/2007 Burrowes ............. B29C 33/405
                                                         428/36.4
2011/0319525 A1* 12/2011 Maeda ................ C08G 59/3218
                                                         523/452
2016/0264740 A1* 9/2016 Imai ........................ C08K 9/04

FOREIGN PATENT DOCUMENTS

JP         6-2274 A       1/1994
JP       2015-7300 A      1/2015
(Continued)

OTHER PUBLICATIONS

Hori et al, "Oxygen distribution in the mesophase pitch fibre after oxidative stabilization," Dec. 1989, Journal of Materials Science, Issue 24, pp. 389-394 (Year: 1989).*

(Continued)

*Primary Examiner* — Maria V Ewald
*Assistant Examiner* — Ethan Weydemeyer
(74) *Attorney, Agent, or Firm* — Birch, Stewart, Kolasch & Birch, LLP

(57) ABSTRACT

Sizing agent coated carbon fibers obtained by coating carbon fibers with a sizing agent comprising at least one of (A) to (Continued)

(C) in a total amount of 80 mass % or more with respect to the whole sizing agent, the carbon fibers each having a surface layer which has a thickness of 10 nm or larger and has an oxygen content of 4% or higher with respect to all the elements, wherein when the sizing agent coated carbon fibers are subjected three times to a 10-minute ultrasonic treatment in an acetone solvent, then the amount of the remaining sizing agent is 0.1-0.25 parts by mass per 100 parts by mass of the sizing agent coated carbon fibers. (A) At least one polymer selected from the group consisting of polyimides, polyetherimides, and polysulfones (B) A compound having a terminal unsaturated group and a polar group in the molecule (C) A polyether-type aliphatic epoxy compound and/or a polyol-type aliphatic epoxy compound which each have an epoxy equivalent of 250 g/eq or less and have two or more epoxy groups in the molecule.

25 Claims, 2 Drawing Sheets

(51) Int. Cl.
| | | |
|---|---|---|
| B32B 37/10 | (2006.01) | |
| C08J 5/06 | (2006.01) | |
| C08J 5/24 | (2006.01) | |
| D06M 15/59 | (2006.01) | |
| D06M 15/63 | (2006.01) | |
| D06M 13/165 | (2006.01) | |
| D06M 13/148 | (2006.01) | |
| D06M 15/70 | (2006.01) | |
| D06M 13/52 | (2006.01) | |
| D06M 13/11 | (2006.01) | |
| C25D 11/02 | (2006.01) | |
| D01F 9/12 | (2006.01) | |
| D06M 101/40 | (2006.01) | |

(52) U.S. Cl.
CPC ............ *B32B 37/10* (2013.01); *C08J 5/24* (2013.01); *C25D 11/02* (2013.01); *D06M 13/11* (2013.01); *D06M 13/148* (2013.01); *D06M 13/165* (2013.01); *D06M 13/52* (2013.01); *D06M 15/59* (2013.01); *D06M 15/63* (2013.01); *D06M 15/70* (2013.01); *B32B 2260/023* (2013.01); *B32B 2260/046* (2013.01); *B32B 2262/106* (2013.01); *B32B 2305/076* (2013.01); *B32B 2305/188* (2013.01); *B32B 2305/20* (2013.01); *B32B 2305/74* (2013.01); *B32B 2307/202* (2013.01); *B32B 2307/206* (2013.01); *B32B 2310/021* (2013.01); *B32B 2310/0418* (2013.01); *B32B 2313/04* (2013.01); *B32B 2363/00* (2013.01); *C08J 2381/02* (2013.01); *C08J 2381/06* (2013.01); *D01F 9/12* (2013.01); *D06M 2101/40* (2013.01); *D06M 2200/40* (2013.01)

(58) Field of Classification Search
CPC ........ B32B 2260/046; B32B 2262/106; B32B 2305/076; B32B 2305/188; B32B 2305/20; B32B 2305/74; B32B 2307/202; B32B 2307/206; B32B 2310/021; B32B 2310/0418; B32B 2313/04; B32B 2363/00; B32B 2381/02; B32B 2381/06; C08J 5/24; C08J 5/06; C08J 2381/02; C08J 2381/06; C25D 11/02; D06M 13/11; D06M 13/148; D06M 13/165; D06M 13/52; D06M 15/59; D06M 15/63; D06M 15/70; D06M 2101/40; D06M 2200/40; D01F 9/12
See application file for complete search history.

(56) References Cited

FOREIGN PATENT DOCUMENTS

| WO | 103103775 A | 5/2013 |
|---|---|---|
| WO | WO 2013/148999 A1 | 10/2013 |

OTHER PUBLICATIONS

International Search Report for PCT/JP2016/050776 (PCT/ISA/210) dated Apr. 12, 2016.
Written Opinion of the International Searching Authority for PCT/JP2016/050776 (PCT/ISA/237) dated Apr. 12, 2016.
Written Opinion of the International Searching Authority (Form PCT/ISA/237), dated Apr. 12, 2016, for International Application No. PCT/JP2016/050776, along with an English translation.

* cited by examiner

SIZING AGENT COATED CARBON FIBER, METHOD FOR PRODUCING SIZING AGENT COATED CARBON FIBER, CARBON FIBER REINFORCED COMPOSITE MATERIAL, AND METHOD FOR PRODUCING CARBON FIBER REINFORCED COMPOSITE MATERIAL

TECHNICAL FIELD

The present invention relates to a sizing agent coated carbon fiber suitable for airplane components, spacecraft components, automobile components, ship components, and the like; a method for producing the sizing agent coated carbon fiber; a prepreg; a carbon fiber reinforced composite material; a method for producing a carbon fiber reinforced composite material; and a molding material. More specifically, they have excellent electrical insulation characteristics.

BACKGROUND ART

Carbon fibers are lightweight and also have excellent strength and elasticity. Accordingly, composite materials combined with various matrix resins have been used in a large number of fields, including airplane components, spacecraft components, automobile components, ship components, civil engineering and construction materials, sporting goods, and the like.

Particularly in applications to electrical/electronic parts, with their size reduction and performance improvement, heat dissipation measures have been required in order to suppress heat generation in the parts. As materials required to have high thermal conductivity, metal materials have been mainly used. However, for adaptation to the size reduction of parts, such materials have been increasingly substituted with resin materials having higher lightweight properties and molding processability. An example of using a carbon fiber as a filler for imparting thermal conductivity to such a resin material has been proposed (see Patent Document 1).

Carbon fibers have high electrical conductivity. Therefore, in applications to electrical/electronic parts, electrical insulation properties have been required. A method for improving the electrical insulation properties of a thermoplastic resin composition, in which the SP values of a sizing agent and a thermoplastic resin are controlled so as to stably disperse a carbon fiber in the resin, thereby increasing the distance between fibers, has been proposed (see Patent Document 2). It is stated that in terms of adhesion, it is preferable that the carbon fiber has a surface oxygen concentration within a range of 0.05 or more. However, no known references have the concept of controlling the electrical characteristics of the carbon fiber surface.

In order to improve the adhesion of a carbon fiber with a matrix resin, usually, a method in which the carbon fiber is subjected to an oxidation treatment such as gas-phase oxidation or liquid-phase oxidation, thereby introducing oxygen-containing functional groups into the carbon fiber surface, has been performed. For example, a method in which a carbon fiber is subjected to an electrolytic treatment, thereby improving the interlaminar shear strength, which is an index of adhesion, has been proposed (see Patent Document 3).

Carbon fibers are brittle and have poor bundling properties and abrasion resistance. As a result, in high-order processing steps, fluffing and yarn breakage are likely to occur. Accordingly, a method in which to a carbon fiber is coated with a sizing agent has been proposed (see Patent Documents 4 and 5).

For example, as a sizing agent, a compound having a plurality of aliphatic epoxy groups has been proposed (see Patent Documents 6, 7, and 8). In addition, a method in which a carbon fiber is coated with, as a sizing agent, an epoxy adduct of a polyalkylene glycol has been proposed (see Patent Documents 9, 10, and 11).

PRIOR ART DOCUMENTS

Patent Documents

Patent Document 1: Japanese Patent Laid-open Publication No. 9-157403
Patent Document 2: Japanese Patent Laid-open Publication No. 2013-117014
Patent Document 3: U.S. Pat. No. 3,957,716
Patent Document 4: Japanese Patent Laid-open Publication No. 57-171767
Patent Document 5: Japanese Patent No. 63-14114
Patent Document 6: Japanese Patent Laid-open Publication No. 7-279040
Patent Document 7: Japanese Patent Laid-open Publication No. 8-113876
Patent Document 8: Japanese Patent Laid-open Publication No. 57-128266
Patent Document 9: U.S. Pat. No. 4,555,446
Patent Document 10: Japanese Patent Laid-open Publication No. 62-033872
Patent Document 11: Japanese Patent Laid-open Publication No. 07-009444

SUMMARY OF THE INVENTION

Problems to be Solved by the Invention

However, in any of the above references, although a carbon fiber surface treatment and a sizing agent are used for the purpose of improving the adhesion and high-order processability, the concept of achieving electrical insulation properties by controlling the carbon fiber surface treatment and the sizing agent has not been disclosed.

Thus, an object of the present invention is to provide, utilizing a carbon fiber surface treatment and a sizing agent, a sizing agent coated carbon fiber having high insulation properties, a method for producing a sizing agent coated carbon fiber, a prepreg, and a carbon fiber reinforced composite material.

In addition, another object of the present invention is to provide, utilizing a carbon fiber surface treatment and a sizing agent, a carbon fiber reinforced resin composition having high insulation properties, a method for producing the same, and a carbon fiber reinforced resin molded article.

In addition, still another object of the present invention is to provide, utilizing a carbon fiber surface treatment and a sizing agent, as well as a laminate structure of a prepreg using them, a laminated prepreg and a carbon fiber reinforced composite material having high insulation properties.

Solutions to the Problems

In order to solve the above problems and achieve the above objects, the present invention is directed to a sizing agent coated carbon fiber including a carbon fiber coated with a sizing agent, the carbon fiber being configured such that when a carbon fiber cross-section is detected by energy-dispersive X-ray spectroscopy, a layer wherein the proportion of oxygen relative to all the elements is 4% or more is present in a thickness of 10 nm or more on a carbon fiber surface, the sizing agent containing (A) to (C) in a total amount of at least 80 mass % or more relative to the total amount of the sizing agent, the sizing agent coated carbon fiber being characterized in that when it is subjected to a 10-minute ultrasonic treatment in an acetone solvent three times, the amount of non-eluted sizing agent remaining on the carbon fiber is 0.1 part by mass or more and 0.25 parts by mass or less per 100 parts by mass of the sizing agent coated carbon fiber:

(A) at least one member selected from the group consisting of polyimide, polyetherimide, and polysulfone, (B) a compound having a terminal unsaturated group and a polar group in a molecule, (C) a polyether-type aliphatic epoxy compound and/or polyol-type aliphatic epoxy compound having an epoxy equivalent of 250 g/eq. or less and having two or more epoxy groups in a molecule.

In addition, the method for producing a sizing agent coated carbon fiber of the present invention is characterized by including, in the above invention, coating the carbon fiber with the sizing agent, followed by a heat treatment at 240° C. or more for 60 to 3,000 seconds.

In addition, the prepreg of the present invention is characterized by being obtainable by impregnating the sizing agent coated carbon fiber of the above invention or a sizing agent coated carbon fiber produced by the method for producing a sizing agent coated carbon fiber of the above invention with a thermosetting resin.

In addition, the carbon fiber reinforced composite material of the present invention is characterized by being obtainable by curing the prepreg of the above invention.

In addition, the carbon fiber reinforced resin composition of the present invention is characterized by containing: the sizing agent coated carbon fiber of the above invention; and a matrix resin including a thermoplastic resin or a radically polymerizable resin.

In addition, the method for producing a carbon fiber reinforced resin composition of the present invention is characterized by including: a step of producing the sizing agent coated carbon fiber of the above invention; and a step of blending the sizing agent coated carbon fiber with a matrix resin.

In addition, the carbon fiber reinforced resin composition of the present invention is characterized by including the carbon fiber reinforced resin composition of the above invention and being a molding material in any one of the following forms (D), (E), (F), and (G):

molding material (D): a columnar molding material, in which the carbon fiber is arranged such that the difference in angle between the axial direction thereof and the major axis line of the molding material is 20° or less, the content of carbon fiber having a length of 50% or less of the length of the molding material is 30 mass % or less, and the average two-dimensional orientation angle defined by a single fiber of the carbon fiber forming the molding material and another single fiber of the carbon fiber closest thereto is 10 to 80°, molding material (E): a molding material, in which the carbon fiber is in the form of a single fiber and substantially two-dimensionally oriented, molding material (F): a molding material in which the carbon fiber is in the form of a bundle and substantially two-dimensionally oriented, molding material (G): a prepreg.

In addition, the laminated prepreg of the present invention is a laminated prepreg including: at least two plies of a carbon fiber layer (b) containing a sizing agent coated carbon fiber (a); and a layer of a polymer resin (c) disposed between the two plies, and is characterized in that (i) the sizing agent coated carbon fiber (a) is the sizing agent coated carbon fiber of the above invention, and (ii) a composite material having an interlayer structure obtainable by solidifying the laminated prepreg has a volume-specific resistance of 500 Ω·m or more in the thickness direction of the laminated prepreg.

In addition, the method for producing a laminated prepreg of the present invention is a method for producing the laminated prepreg of the above invention, and is characterized in that the sizing agent coated carbon fiber (a) is obtained through a step of coating a carbon fiber with a sizing agent, followed by a heat treatment at 240° C. or more for 60 to 3,000 seconds.

Effects of the Invention

According to the present invention, it is possible to obtain a sizing agent coated carbon fiber that allows for the production of a carbon fiber reinforced composite material having high electrical insulation properties, a carbon fiber reinforced resin composition having high electrical insulation properties, and a laminated prepreg that exhibits high electrical insulation properties.

EMBODIMENTS OF THE INVENTION

Figure 1:
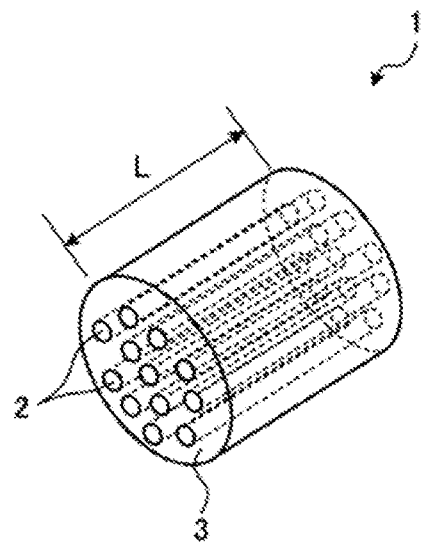
FIG. 1 is a perspective view showing an example of a molding material according to an embodiment of the present invention.

Hereinafter, embodiments of the sizing agent coated carbon fiber and the method for producing a sizing agent coated carbon fiber of the present invention will be described in further detail.

The present invention is directed to a sizing agent coated carbon fiber including a carbon fiber coated with a sizing agent, the carbon fiber being configured such that when a carbon fiber cross-section is detected by energy-dispersive X-ray spectroscopy, a layer wherein the proportion of oxygen relative to all the elements is 4% or more is present in a thickness of 10 nm or more on a carbon fiber surface, the sizing agent containing (A) to (C) in a total amount of 80 mass % or more relative to the total amount of the sizing agent, the sizing agent coated carbon fiber being configured such that when the sizing agent coated carbon fiber is subjected to a 10-minute ultrasonic treatment in an acetone solvent three times, the amount of non-eluted sizing agent remaining on the carbon fiber is 0.1 part by mass or more and 0.25 parts by mass or less per 100 parts by mass of the sizing agent coated carbon fiber:

(A) at least one member selected from the group consisting of polyimide, polyetherimide, and polysulfone, (B) a compound having a terminal unsaturated group and a polar group in a molecule, (C) a polyether-type aliphatic epoxy compound and/or polyol-type aliphatic epoxy compound having an epoxy equivalent of 250 g/eq. or less and having two or more epoxy groups in a molecule.

The present inventors have found that high electrical insulation properties are improved when a sizing agent coated carbon fiber composed of a carbon fiber having a specific surface structure coated with a sizing agent of specific composition is used in a carbon fiber composite material, and thus accomplished the present invention. That is, the present inventors have found that although a known carbon fiber and a known sizing agent may be used, when a carbon fiber having a specific surface structure is coated with a sizing agent of specific composition, and they are allowed to have strong interaction under specific conditions, high electrical insulation properties are obtained.

In the sizing agent coated carbon fiber of the present invention, it has been confirmed that the electrical insulation properties are not sufficient in the case where the carbon fiber is composed only of a carbon fiber configured such that when a carbon fiber cross-section is detected by energy-dispersive X-ray spectroscopy, a layer wherein the proportion of oxygen relative to all the elements is 4% or more is present in a thickness of 10 nm or more on a carbon fiber surface, and the sizing agent coated carbon fiber is not configured such that when it is subjected to a 10-minute ultrasonic treatment in an acetone solvent three times, the amount of non-eluted sizing agent remaining on the carbon fiber is 0.1 part by mass or more and 0.25 parts by mass or less per 100 parts by mass of the sizing agent coated carbon fiber.

In addition, it has been confirmed that even if the sizing agent coated carbon fiber is configured such that when it is subjected to a 10-minute ultrasonic treatment in an acetone solvent three times, the amount of non-eluted sizing agent remaining on the carbon fiber is 0.1 part by mass or more and 0.25 parts by mass or less per 100 parts by mass of the sizing agent coated carbon fiber, the electrical insulation properties are not sufficient in the case where a carbon fiber configured such that when a carbon fiber cross-section is detected by energy-dispersive X-ray spectroscopy, a layer wherein the proportion of oxygen relative to all the elements is 4% or more is present in a thickness of 10 nm or more on a carbon fiber surface is not used.

In the sizing agent coated carbon fiber of the present invention, it is important that the electrical insulation properties are high when all of the following conditions are satisfied: the carbon fiber is configured such that when a carbon fiber cross-section is detected by energy-dispersive X-ray spectroscopy, a layer wherein the proportion of oxygen relative to all the elements is 4% or more is present in a thickness of 10 nm or more on a carbon fiber surface; the total amount of the specific (A) to (C) is 80 mass % or more relative to the total amount of the sizing agent; and the sizing agent coated carbon fiber is configured such that when it is subjected to a 10-minute ultrasonic treatment in an acetone solvent three times, the amount of non-eluted sizing agent remaining on the carbon fiber is 0.1 part by mass or more and 0.25 parts by mass or less per 100 parts by mass of the sizing agent coated carbon fiber.

First, the carbon fiber used in the present invention will be described. Examples of carbon fibers for use in the present invention include polyacrylonitrile (sometimes abbreviated as PAN)-based, rayon-based, and pitch-based carbon fibers. Among them, it is preferable to use PAN-based carbon fibers, which have an excellent balance of strength and elasticity.

The carbon fiber of the present invention is configured such that when a carbon fiber cross-section is detected by energy-dispersive X-ray spectroscopy (EDX), a layer wherein the proportion of oxygen relative to all the elements is 4% or more is present in a thickness of 10 nm or more on a carbon fiber surface.

When the thickness of the high-oxygen-concentration region on the surface of the carbon fiber is 10 nm or more, the resulting electrical insulation properties are high. It is preferable that the thickness is 12 nm or more, still more preferably 15 nm or more. In addition, although it is preferable that the thickness is large in terms of electrical insulation properties, a thickness of 30 nm is sufficient.

In the present invention, the oxygen concentration of the carbon fiber surface is measured as follows. From a carbon fiber before coating with a sizing agent, a slice having a thickness of about 100 nm is produced in the cross-sectional direction using a focused ion beam (sometimes abbreviated as FIB), and arbitrary three points are observed under an atomic resolution analytical electron microscope device with a spot diameter of 0.2 nm or less using energy-dispersive X-ray spectroscopy as a detector. In the direction perpendicular to the circumference of the carbon fiber, the proportion of the element concentration of a 20-nm-wide area is measured from the inside of the carbon fiber toward the protection film. On the resulting line profile, the thickness at which the oxygen concentration reaches 4% or more is defined as the thickness of the high-oxygen-concentration region on the surface of the carbon fiber.

In addition, in the carbon fiber of the present invention, it is preferable the ratio $(\beta)/(\alpha)$ between the following $(\alpha)$ and $(\beta)$ determined by X-ray photoelectron spectroscopy using $AlK\alpha_{1,2}$ is 0.8 or more.

($\alpha$): Surface oxygen concentration (O/C) that is the ratio of the number of atoms of oxygen (O) to that of carbon (C) on a fiber surface of the carbon fiber measured at a photoelectron take-off angle of 10°.

($\beta$): Surface oxygen concentration (O/C) that is the ratio of the number of atoms of oxygen (O) to that of carbon (C) on a fiber surface of the carbon fiber measured at a photoelectron take-off angle of 90°.

By increasing the photoelectron take-off angle, the information of a region deeper than near the surface can be obtained. Accordingly, when $(\beta)/(\alpha)$ is large, this indicates that the oxygen concentration does not vary much from near the surface toward the inside. When $(\beta)/(\alpha)$ is 0.8 or more, the electrical insulation properties are further improved, which is preferable. It is more preferable that $(\beta)/(\alpha)$ is 0.85 or more, still more preferably 0.9 or more.

The oxygen concentration of the carbon fiber surface can be determined by X-ray photoelectron spectroscopy according to the following procedure. First, a carbon fiber before coating with a sizing agent, from which dirt and the like adhering to the carbon fiber surface have been removed with a solvent, is cut to 20 mm and spread over a sample support table made of copper. Using $AlK\alpha_{1,2}$ as the X-ray source, measurement is performed while maintaining the inside of the sample chamber at $1 \times 10^{-8}$ Torr. The concentration was measured at photoelectron take-off angles of 10° and 90°. As a correction value for the peak accompanying electrification during measurement, the binding energy value of the main peak (peak top) of $C_{1s}$ is set at 284.6 eV. The $C_{1s}$ peak area is determined by drawing a straight baseline within a range of 282 to 296 eV, and the $O_{1s}$ peak area is determined by drawing a straight baseline within a range of 528 to 540 eV.

The surface oxygen concentration (O/C) is expressed as anatomic ratio calculated by dividing the above $O_{1s}$ peak area ratio by the device-specific sensitivity correction value. In the case where ESCA-1600 manufactured by ULVAC-PHI is used as the X-ray photoelectron spectroscopy device, the device-specific sensitivity correction value is 2.33.

It is preferable that the sizing agent coated carbon fiber according to the present invention has a strand strength of 3.5 GPa or more, more preferably 4 GPa or more, and still more preferably 5 GPa or more. In addition, it is preferable that the strand elasticity is 220 GPa or more, more preferably 250 GPa or more, and still more preferably 280 GPa or more. When the strand strength and/or strand elasticity is high, in the case where the sizing agent coated carbon fiber of the present invention is used as a composite material, the amount of sizing agent coated carbon fiber used can be reduced, resulting in higher electrical insulation properties; therefore, this is preferable.

In the present invention, the strand tensile strength and elasticity described above can be determined in accordance with JIS-R-7608 (2004), Resin-Impregnated Strand Test Method, according to the following procedure. The resin formulation is as follows: "Celloxide®" 2021P (manufactured by Daicel Chemical Industries, Ltd.)/boron trifluoride monoethylamine (manufactured by Tokyo Chemical Industry Co., Ltd.)/acetone=100/3/4 (part by mass). The curing conditions are as follows: normal pressure, 130° C., 30 minutes. Ten strands were subjected to the measurement, and the averages were defined as the strand tensile strength and the strand elasticity, respectively.

In addition, it is preferable that the number of filaments of the carbon fiber is 1,000 to 100,000, still more preferably 50,000 or less.

In the present invention, it is preferable that the single-yarn fineness of the carbon fiber is 0.8 dtex or less, more preferably 0.5 dtex or less. Because the resulting carbon fiber has high strength and elasticity, in the case where the sizing agent coated carbon fiber of the present invention is used as a composite material, the amount of sizing agent coated carbon fiber used can be reduced, resulting in higher electrical insulation properties; therefore, this is preferable. In addition, when the single-yarn fineness is 0.3 dtex or more, single-fiber cutting during the process is less likely to occur, and the productivity is less likely to decrease; therefore, this is preferable.

The single-yarn fineness is determined by measuring the total fineness of the sizing agent coated carbon fiber, and dividing the total fineness by the number of filaments of the sizing agent coated carbon fiber.

It is preferable that the twist of the sizing agent coated carbon fiber of the present invention is not more than 1 turn/m. When the twist is not more than 1 turn/m, in the case where the sizing agent coated carbon fiber of the present invention is used as a composite material, single yarns are dispersed in the matrix resin, resulting in higher electrical insulation properties; therefore, this is preferable. It is more preferable that the twist is 0.2 turns or less, still more preferably 0 turn. That is, the fiber is preferably non-twisted.

Incidentally, in the present invention, the twist of a sizing agent coated carbon fiber is determined as follows. Both ends of 4 m of the sizing agent coated carbon fiber to be measured are each fixed with a clip. A 1-mmϕ metal bar is inserted into the center of the carbon fiber bundle nearest to the inner side of one clip, then the metal bar is slid to near the other clip, and the number of turns of the fiber between the metal bar and the other clip is counted. The measurement is performed five times, and the arithmetic average is defined as A. Further, the twist per m is determined by the following equation.

$$\text{Twist(turns/m)} = A/4.$$

It is preferable that the average tearable distance of the sizing agent coated carbon fiber of the present invention is 300 mm or more. When the average tearable distance is 300 mm or more, in the case where the sizing agent coated carbon fiber of the present invention is used as a composite material, single yarns are dispersed in the matrix resin, resulting in higher electrical insulation properties; therefore, this is preferable. It is more preferable that the average tearable distance is 400 mm or more, still more preferably 500 mm or more. In terms of the bundling properties of a yarn, etc., it is preferably 700 mm or less.

The average tearable distance is an index indicating the entanglement state of the fiber bundle and is determined as follows. First, a fiber bundle is cut to a length of 1,160 mm, and one end is immovably fixed onto a horizontal table with an adhesive tape (this point is referred to as fixed point A). The other, non-fixed end of the fiber bundle is divided into two parts with a finger, and one is immovably fixed onto the table with an adhesive tape under tension (this point is referred to as fixed point B). Using the fixed point A as a supporting point, the other of the two parts is moved along the table while preventing sagging, held at a straight-line distance of 500 mm from the fixed point B, and immovably fixed onto the table with an adhesive tape (this point is referred to as fixed point C). The region defined by the fixed points A, B, and C is visually observed to find the point of entanglement furthest from the fixed point A, and its distance projected on the straight line connecting the fixed point A and the fixed point B is read with a ruler having a minimum scale of 1 mm and defined as the tearable distance. The above operation is repeated 30 times, and the arithmetic average of the measured values is defined as the average tearable distance. In this measurement method, the point of entanglement furthest from the fixed point A is the point that is furthest in straight-line distance from the fixed point A, at which three or more non-sagging single fibers are entangled.

Next, the sizing agent used in the present invention will be described.

In the sizing agent used in the present invention, the total amount of (A) to (C) is 80 mass % or more relative to the total amount of the sizing agent:

(A) at least one member selected from polyimide, polyetherimide, and polysulfone, (B) a compound having a terminal unsaturated group and a polar group in a molecule, (C) a polyether-type aliphatic epoxy compound and/or polyol-type aliphatic epoxy compound having an epoxy equivalent of 250 g/eq. or less and having two or more epoxy groups in a molecule.

In the present invention, it is preferable that the amount of sizing agent attached to the carbon fiber is within a range of 0.1 to 10.0 mass %, more preferably within a range of 0.2 to 3.0 mass %, relative to the sizing agent coated carbon fiber. When the amount of sizing agent attached is 0.1 mass % or more, in the case where the sizing agent coated carbon fiber is formed into a prepreg or woven, the fiber can withstand abrasion with the passing metal guide and the like. Accordingly, fluffing is suppressed, and the electrical insulation properties are improved; therefore, this is preferable. Meanwhile, when the amount of sizing agent attached is 10.0 mass % or less, the matrix resin is impregnated into the carbon fiber without being obstructed by the sizing agent membrane around the sizing agent coated carbon fiber. Accordingly, in the resulting composite material, void formation is suppressed, forming an excellent-quality composite material; therefore, this is preferable.

The amount of sizing agent attached is determined as follows. 2±0.5 g of a sizing agent coated carbon fiber is collected and subjected to a heating treatment in a nitrogen atmosphere at 450° C. for 15 minutes, and the change in mass before and after the heating treatment at this time is measured. The amount of mass change is divided by the mass before the heating treatment, and the quotient (mass %) is defined as the amount of sizing agent attached.

It is important that that when the sizing agent coated carbon fiber of the present invention is subjected to a 10-minute ultrasonic treatment in an acetone solvent three times, the amount of non-eluted sizing agent remaining on the carbon fiber is 0.1 part by mass or more and 0.25 parts by mass or less per 100 parts by mass of the sizing agent coated carbon fiber.

The treatment in an acetone solvent is performed as follows. 2±0.5 g of a sizing agent coated carbon fiber is collected, placed in 50 ml of acetone, and ultrasonically treated for 10 minutes. This treatment is further repeated twice, followed by washing, and then the amount of sizing agent attached to the sizing agent coated carbon fiber is measured by the method described above.

The present inventors have found that there is a correlation between the amount of non-eluted sizing remaining on the carbon fiber and the electrical insulation properties. When the sizing agent coated carbon fiber is used as a composite material, the amount of non-eluted sizing remaining on the carbon fiber is correlated with the sizing agent that has not been diffused into the matrix resin and is localized on the carbon fiber surface. The prevent inventors believe that such a sizing agent improves the electrical insulation properties between adjacent carbon fibers. It is preferable that the amount is 0.12 parts by mass or more, still more preferably 0.15 parts by mass or more, and more preferably 0.18 parts by mass or more. In terms of electrical insulation properties, an amount of 0.25 parts by mass or less is sufficient.

The non-eluted sizing agent remaining on the carbon fiber can be controlled by the kinds of carbon fiber and sizing agent described above and also by the heat treatment after coating with a sizing agent.

In the present invention, it is important that the total amount of (A) to (C) is 80 mass % or more relative to the total amount of the sizing agent. As a result of various studies, it has been found that (A) to (C) all have strong interaction with the carbon fiber surface and exhibit high electrical insulation properties. It is preferable that the total amount is 85 mass % or more, still more preferably 90 mass % or more.

In the present invention, the sizing agent components (A) to (C) may be used alone, or it is also possible to use two or more of them. In addition, it is also possible to use two or more kinds of each component.

The sizing agent component (A) used in the present invention is at least one member selected from the group consisting of polyimide, polyetherimide, and polysulfone.

Polyimide, polyetherimide, and polysulfone are all not easily eluted into a matrix resin. Therefore, when they are localized on the carbon fiber surface, the electrical insulation properties are improved; therefore, this is preferable. A low molecular weight or precursor thereof can be applied as a sizing agent, and then increased in molecular weight or polymerized on the carbon fiber surface.

For example, in the case where polyimide or polyetherimide is used as a sizing agent component (A), polyimide or polyetherimide may be applied as a sizing agent, or it is also possible to apply polyamic acid, which is a precursor. In the case where polyamic acid is used as a precursor, polyamic acid may remain. However, it is preferable that the imidization ratio is 80% or more, more preferably 90% or more, and still more preferably 95% or more. The imidization ratio X of polyimide (%) is determined by the following equation.

$$X=(1-D/C)\times 100.$$

Here, C is the mass decrease rate of completely non-imidized polyamic acid at 130° C. and 415° C., and D is the mass decrease rate of polyimide under the same conditions. Using a TGA device, in an air atmosphere, the temperature is held at 110° C. for 2 hours and then raised at 10° C./min to 450° C.

Polysulfone used in the present invention is a high-molecular compound having a repeating structure containing a sulfonyl group. It is also possible to use a polysulfone amide derivative, polyethersulfone, or a like derivative.

The sizing agent component (B) used in the present invention is a compound having a terminal unsaturated group and a polar group in a molecule. As a result of the polymerization of the terminal unsaturated group on the carbon fiber surface, localization on the carbon fiber surface is facilitated, whereby the electrical insulation properties are improved.

Examples of compounds having a polar group and a terminal unsaturated group in the present invention include compounds resulting from the reaction of an unsaturated alcohol, an unsaturated carboxylic acid, and an isocyanate compound, such as known unsaturated polyurethane compounds, wherein the unsaturated alcohol is allyl alcohol, for example, the unsaturated carboxylic acid is acrylic acid, methacrylic acid, or the like, and the isocyanate compound is hexamethylene diisocyanate, isophorone diisocyanate, tolylene diisocyanate, ditolylene diisocyanate, diphenylmethane diisocyanate, or the like.

In particular, a compound that is a polyurethane compound having an acrylate group and a methacrylate group as terminal unsaturated groups is preferable. It is preferable to use at least one compound selected from a phenyl glycidyl ether acrylate hexamethylene diisocyanate compound, a phenyl glycidyl ether acrylate tolylene diisocyanate compound, a pentaerythritol acrylate hexamethylene diisocyanate compound, a phenyl glycidyl ether triacrylate isophorone diisocyanate compound, a glycerol dimethacrylate tolylene diisocyanate compound, a glycerol dimethacrylate isophorone diisocyanate compound, a pentaerythritol triacrylate tolylene diisocyanate compound, a pentaerythritol triacrylate isophorone diisocyanate, and a triallyl isocyanurate compound.

Examples of compounds having a terminal unsaturated group and an amide bond as a polar group include N,N-dimethylacrylamide, N,N-dimethylaminoethyl acrylate, N,N-dimethylaminopropylacrylamide, acryloyl morpholine, N-isopropylacrylamide, and N,N-diethylacrylamide. Examples of compounds having a sulfo group and a terminal unsaturated group include bisphenol-S-type diglycidyl diacrylate and bisphenol-S-type diglycidyl dimethacrylate.

The structure of a preferred sizing agent is an aliphatic compound that facilitates an increase in molecular weight on the carbon fiber surface, does not allow a rigid, sterically large compound to be interposed at the interface between the carbon fiber and the matrix resin, contains no aromatic ring, has a linear molecular chain, and is flexible. In particular, an aliphatic polyisocyanate compound having a terminal unsaturated group and a polar group, that is, a polyisocyanate compound having a polyethylene glycol skeleton or a polyalkylene skeleton, is preferable.

The sizing agent component (C) used in the present invention is a polyether-type aliphatic epoxy compound and/or polyol-type aliphatic epoxy compound having two or more epoxy groups in a molecule. Because of its particularly strong interaction with a carbon fiber, the sizing agent component is localized on the carbon fiber surface, whereby the electrical insulation properties are improved.

The aliphatic epoxy compound in the present invention is an epoxy compound containing no aromatic ring in the molecule. An epoxy compound having a plurality of epoxy groups in the molecule and having a flexible aliphatic main chain interacts with surface functional groups of the carbon fiber and firmly adheres to the carbon fiber surface. As a result, the electrical insulation properties are improved.

In addition, the aliphatic epoxy compound used in the present invention has two or more epoxy groups in the molecule. In terms of electrical insulation properties, it is preferable that the number of epoxy groups is 3 or more, still more preferably 4 or more. In terms of electrical insulation properties, ten epoxy groups are sufficient.

The epoxy equivalent of the sizing agent component (C) used in the present invention is 250 g/eq. or less, still more preferably 180 g/eq. or less. When the epoxy equivalent is 250 g/eq. or less, such an aliphatic epoxy compound strongly interacts with the carbon fiber surface, whereby the electrical insulation properties are improved. Although the lower limit of the epoxy equivalent is not particularly set, in terms of electrical insulation properties, an epoxy equivalent of 90 g/eq. or more is sufficient.

The aliphatic epoxy compound used in the present invention may also have other functional groups in the molecule in addition to epoxy groups. The functional groups that the aliphatic epoxy compound has in addition to an epoxy group may be selected from a hydroxyl group, an amide group, an imide group, a urethane group, a urea group, a sulfonyl group, and a sulfo group. In terms of improving the interaction with a carbon fiber, it is particularly preferable to have a hydroxyl group.

The aliphatic epoxy compound used in the present invention may be an epoxy compound obtained by the reaction of one member selected from ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, polybutylene glycol, 1,2-butanediol, 1,3-butanediol, 1,4-butanediol, 2,3-butanediol, 1,5-pentanediol, neopentyl glycol, 1,6-hexanediol, 1,4-cyclohexanedimethanol, glycerol, diglycerol, polyglycerol, trimethylolpropane, pentaerythritol, sorbitol, and arabitol, with epichlorohydrin. Among them, it is preferable to use a glycidyl-ether-type epoxy compound obtained by the reaction of one member selected from glycerol, diglycerol, polyglycerol, trimethylolpropane, pentaerythritol, sorbitol, and arabitol with epichlorohydrin. These compounds can be localized on the carbon fiber surface, resulting in higher electrical insulation properties, and thus are preferable. In addition, they are particularly preferable in that they have high solubility in water, methanol, ethanol, 2-propanol, acetone, methyl ethyl ketone, dimethylformamide, dimethylacetamide, and like polar solvents, and, when the carbon fiber is coated with such a sizing agent, the sizing agent can be used as a uniform sizing agent solution. They may be used alone, and it is also possible to use a combination of two or more kinds.

Specific examples of these compounds as products include polyglycerol polyglycidyl ether (e.g., "Denacol®" EX-512 and EX-521 manufactured by Nagase ChemteX Corporation), trimethylolpropane polyglycidyl ether (e.g., "Denacol®" EX-321 manufactured by Nagase ChemteX Corporation), glycerol polyglycidyl ether (e.g., "Denacol®" EX-313 and EX-314 manufactured by Nagase ChemteX Corporation), sorbitol polyglycidyl ether (e.g., "Denacol®" EX-611, EX-612, EX-614, EX-614B, and EX-622 manufactured by Nagase ChemteX Corporation), and pentaerythritol polyglycidyl ether (e.g., "Denacol®" EX-411 manufactured by Nagase ChemteX Corporation).

In the present invention, in addition to the sizing agent components (A) to (C), as additives such as surfactants, it is preferable to use, for example, polyalkylene oxides such as polyethylene oxide and polypropylene oxide, compounds such as a higher alcohol, a polyhydric alcohol, an alkylphenol, a styrenated phenol, and the like added with a polyalkylene oxide such as polyethylene oxide or polypropylene oxide, and nonionic surfactants such as a block copolymer of ethylene oxide and propylene oxide. In addition, without affecting the effects of the present invention, a polyester resin, an unsaturated polyester compound, and the like may also be suitably added.

Next, a method for producing of a PAN-based carbon fiber will be described.

As the spinning method for obtaining a precursor fiber of the carbon fiber, a known method such as a wet process, a dry process, or a dry-wet process may be used.

As the spinning dope, a solution of a homopolymer or copolymer of polyacrylonitrile dissolved in a solvent may be used.

The above spinning dope is spun through a nozzle, discharged into a spinning bath or air, and then solidified in the spinning bath. As the spinning bath, an aqueous solution of the solvent used as the solvent of the spinning dope may be used. It is preferable that the spinning solution contains the same solvent as the solvent of the spinning dope, and an aqueous dimethyl sulfoxide solution and an aqueous dimethylacetamide solution are suitable. The fiber solidified in the spinning bath is washed with water and drawn to give a precursor fiber. The obtained precursor fiber is subjected to a flame-proof treatment and a carbonization treatment, and further to a graphitization treatment as necessary, thereby giving a carbon fiber. As the conditions for the carbonization treatment and the graphitization treatment, it is preferable that the maximum heat treatment temperature is 1,100° C. or more, more preferably 1,400 to 3,000° C.

The obtained carbon fiber is subjected to an oxidation treatment in order to form a high-oxygen-concentration layer on the carbon fiber surface to improve the electrical insulation properties. As the oxidation treatment method, it is possible to use gas-phase oxidation, liquid-phase oxidation, or liquid-phase electrolytic oxidation. However, in terms of offering high productivity and allowing the fiber to be uniformly treated, it is preferable to use liquid-phase electrolytic oxidation.

In the present invention, examples of electrolyte solutions for use in liquid-phase electrolytic oxidation include acidic electrolyte solutions and alkaline electrolyte solutions.

Examples of acidic electrolyte solutions include inorganic acids such as sulfuric acid, nitric acid, hydrochloric acid, phosphoric acid, boric acid, and carbonic acid, organic acids such as acetic acid, butanoic acid, oxalic acid, acrylic acid, and maleic acid, and salts such as ammonium sulfate and ammonium hydrogen sulfate. Among them, sulfuric acid and nitric acid, which show strong acidity, are preferably used.

Specific examples of alkaline electrolyte solutions include aqueous solutions of hydroxides such as sodium hydroxide, potassium hydroxide, magnesium hydroxide, calcium hydroxide, and barium hydroxide, aqueous solutions of carbonates such as sodium carbonate, potassium carbonate, magnesium carbonate, calcium carbonate, barium carbonate, and ammonium carbonate, aqueous solutions of hydrogen carbonates such as sodium hydrogen carbonate, potassium hydrogen carbonate, magnesium hydrogen carbonate, calcium hydrogen carbonate, barium hydrogen carbonate, and ammonium hydrogen carbonate, and aqueous solutions of ammonia, a tetraalkylammonium hydroxide, and hydrazine. Among them, it is preferable to use an aqueous solution of ammonium carbonate or ammonium hydrogen carbonate or an aqueous solution of a tetraalkylammonium hydroxide showing strong alkalinity. This is because they do not contain an alkali metal, which inhibits the curing of a matrix resin.

It is preferable that the concentration of the electrolyte solution used in the present invention is within a range of 0.01 to 5 mol/L, more preferably within a range of 0.1 to 1 mol/L. When the concentration of the electrolyte solution is 0.01 mol/L or more, the electrolytic treatment voltage can be reduced, which is advantageous in terms of operation cost. Meanwhile, when the concentration of the electrolyte solution is 5 mol/L or less, this is advantageous in terms of safety.

It is preferable that the temperature of the electrolyte solution used in the present invention is 40° C. or more, more preferably 60° C. or more. When the temperature of the electrolyte solution is 40° C. or more, the efficiency of the electrolytic treatment is improved, resulting in higher electrical insulation properties with the same amount of surface treatment. Meanwhile, when the temperature of the electrolyte solution is less than 100° C., this is advantageous in terms of safety.

In the present invention, it is preferable that the electrical quantity in liquid-phase electrolytic oxidation is optimized according to the carbonization degree of the carbon fiber so that the high-oxygen-concentration layer on the carbon fiber surface described above will be 10 nm or more. In the case where the carbon fiber to be treated has high elasticity, a larger electrical quantity is necessary as compared with the case of a carbon fiber having low elasticity.

In the present invention, it is preferable that the current density during liquid-phase electrolytic oxidation is not more than 5 A per $m^2$ of the surface area of the carbon fiber in the electrolytic treatment liquid, more preferably 3 $A/m^2$ or less, and still more preferably 1.5 $A/m^2$ or less. A decrease in current density results in higher electrical insulation properties and thus is preferable. Although the reason thereof is not clear, it is believed that such an effect is caused by the uniform surface treatment of the carbon fiber surface.

In the present invention, it is preferable that the carbon fiber after the electrolytic treatment is washed with water and dried. As a method for washing, for example, a dip method or a spray method may be used. Among them, it is preferable to use a dip method, according to which washing is easy. Further, in a preferred mode, a dip method is performed while ultrasonically exciting the carbon fiber. In addition, when the drying temperature is too high, functional groups present on the outermost surface of the carbon fiber are likely to disappear due to thermal decomposition. Therefore, it is preferable that drying is performed at a temperature as low as possible. Specifically, it is preferable that the drying temperature is 250° C. or less, and it is still more preferable that drying is performed at 210° C. or less. Meanwhile, considering the efficiency of drying, it is preferable that the drying temperature is 110° C. or more, more preferably 140° C. or more.

Next, a method for producing a sizing agent coated carbon fiber, which is prepared by coating the carbon fiber described above with a sizing agent, will be described.

Next, the method for producing a sizing agent coated carbon fiber of the present invention will be described.

First, techniques for coating a carbon fiber with a sizing agent (application) in the present invention will be described. In the present invention, it is preferable to use a method in which the coating with a sizing agent is performed at once using a sizing-agent-containing liquid prepared by simultaneously dissolving or dispersing components used for the sizing agent, or a method in which the carbon fiber is coated in several stages using sizing-agent-containing liquids separately prepared by dissolving or dispersing any of sizing agents (A) to (C) and additional components arbitrarily selected. In the present invention, in terms of effects and the ease of treatment, it is more preferable to employ single-stage application, in which a carbon fiber is coated at once with a sizing-agent-containing liquid containing all the constituent components of a sizing agent.

Examples of solvents used for the dilution of a sizing agent component in the present invention include water, methanol, ethanol, 2-propanol, acetone, methyl ethyl ketone, dimethylformamide, and dimethylacetamide. Among them, it is preferable to use water, which is easy to handle and advantageous in terms of safety.

Examples of application techniques include a method in which a carbon fiber is immersed in a sizing agent solution through a roller, a method in which a carbon fiber is brought into contact with a roller having a sizing agent solution attached thereto, and a method in which a sizing agent solution is sprayed in mist form to a carbon fiber. For the production of the sizing agent coated carbon fiber of the present invention, it is preferable to use a method in which a carbon fiber is immersed in a sizing agent solution through a roller. In addition, the application of a sizing agent may be batch-wise or continuous, but it is preferable to employ continuous application, which is more productive and results in smaller variations. In addition, a mode in which the carbon fiber is ultrasonically excited at the time of sizing agent application is also preferable.

It is preferable that the concentration/temperature of the sizing agent solution, the yarn tension, and the like are controlled in order for the amount of sizing agent components attached to the carbon fiber to be within the appropriate range. As the concentration of the sizing agent solution, it is preferable to use a solution having sizing agent components at 0.1 mass % or more and 20 mass % or less, more preferably 0.2 mass % or more and 5 mass % or less.

It is preferable that the carbon fiber after coating with the sizing agent is subjected to a heat treatment at 240° C. or more for 60 to 3,000 seconds. When the heat treatment is performed at 240° C. or more, the molecular weight of the sizing agent is increased, or the reaction thereof proceeds; therefore, this is preferable. In the case where the sizing agent coated carbon fiber of the present invention is used as a composite material, the diffusion of the sizing agent into the matrix resin is suppressed, and the sizing agent is localized on the carbon fiber surface, resulting in higher electrical insulation properties; therefore, this is preferable. It is preferable that the heat treatment is performed at 250° C. or more, still more preferably 260° C. or more. In addition, it is preferable that the heat treatment time is 60 to 3,000 seconds. When it is 60 seconds or more, the molecular weight of the sizing agent is increased, or the reaction thereof proceeds; therefore, this is preferable. It is more preferable that the heat treatment time is 90 seconds or more, 120 seconds or more, and still more preferably 1,000 seconds or more. A heat treatment time of 3,000 seconds or less is sufficient.

In addition, in the heat treatment, it is possible that the heat treatment at 240° C. or more is performed in addition to a heat treatment at less than 240° C. In addition, the heat treatment may be performed by bringing the sizing agent coated carbon fiber into contact with a heated roller, by heating using air or an inert gas such as nitrogen as a heat medium, or by non-contact heating. In this case, it is preferable that the total time of heat-treating the fiber at 240° C. or more is 60 to 3,000 seconds.

The sizing agent coated carbon fiber of the present invention is used in the form of a tow, a woven fabric, a knitted fabric, a plaited cord, a web, a mat, or chopped, for example. In particular, when used for applications where high specific strength and high specific elasticity are required, a tow with the carbon fiber being aligned in one direction is most suitable. Further, it is preferable to use a prepreg impregnated with a matrix resin.

Next, the prepreg and the carbon fiber reinforced composite material of the present invention will be described.

In the present invention, the prepreg is obtained by impregnating the sizing agent coated carbon fiber described above or a sizing agent coated carbon fiber produced by the method described above with a matrix resin. At the time of curing the prepreg of the present invention, when the sizing agent coated carbon fiber described above or a sizing agent coated carbon fiber produced by the method described above is used, a carbon fiber reinforced composite material having excellent electrical insulation properties can be obtained; therefore, this is preferable.

In the present invention, as a matrix resin, it is possible to use a thermosetting resin or a thermoplastic resin (resin described herein may also be a resin composition). However, a thermosetting resin can be preferably used.

Examples of thermosetting resins include resins such as an unsaturated polyester resin, a vinyl ester resin, an epoxy resin, a phenol resin, a melamine resin, a urea resin, a thermosetting polyimide resin, a cyanate ester resin, and a bismaleimide resin, modification products thereof, and resins composed of two or more kinds blended. Among them, it is preferable to use an epoxy resin, which has an excellent balance of mechanical characteristics and is advantageous in that cure shrinkage is small.

Epoxy compounds used for the epoxy resin are not particularly limited, and it is possible to use at least one member selected from a bisphenol-type epoxy compound, an amine-type epoxy compound, a phenol novolac-type epoxy compound, a cresol novolac-type epoxy compound, a resorcinol-type epoxy compound, a phenol aralkyl-type epoxy compound, a naphthol aralkyl-type epoxy compound, a dicyclopentadiene-type epoxy compound, an epoxy compound having a biphenyl skeleton, an isocyanate-modified epoxy compound, a tetraphenylethane-type epoxy compound, a triphenylmethane-type epoxy compound, and the like.

In addition, examples of curing agents include, but are not particularly limited to, aromatic amine curing agents, dicyanamide, and derivatives thereof. In addition, it is also possible to use an amine such as alicyclic amine, a phenolic compound, an acid anhydride, polyamidoamino, organic acid hydrazide, or isocyanate together with an aromatic amine curing agent.

Among them, it is preferable to use an epoxy resin containing a polyfunctional glycidylamine-type epoxy resin and an aromatic diamine curing agent. Generally, a matrix resin containing a polyfunctional glycidylamine-type epoxy resin and an aromatic diamine curing agent has a high crosslinking density and can improve the heat resistance and compressive strength of a carbon fiber reinforced composite material.

As polyfunctional glycidylamine-type epoxy resins, tetraglycidyl diaminodiphenylmethane, triglycidyl aminophenol, triglycidyl aminocresol, and the like can be preferably used. A polyfunctional glycidylamine-type epoxy resin has an effect to enhance the heat resistance, and its proportion is preferably such that it is contained at 30 to 100 mass % per 100 mass % of the entire epoxy resin. In the case where the proportion of the glycidylamine-type epoxy resin is 30 mass % or more, the compressive strength of the carbon fiber reinforced composite material is improved, resulting in excellent heat resistance.

The aromatic diamine curing agent is not particularly limited as long as it is an aromatic amine used as an epoxy resin curing agent. Specific preferred examples thereof include 3,3'-diaminodiphenylsulfone (3,3'-DDS), 4,4'-diaminodiphenylsulfone (4,4'-DDS), diaminodiphenylmethane (DDM), diaminodiphenyl ether (DADPE), bisaniline, benzyldimethylaniline, 2-(dimethylaminomethyl)phenol (DMP-10), 2,4,6-tris(dimethylaminomethyl)phenol (DMP-30), and tri-2-ethylhexylate of DMP-30, as well as isomers and derivatives thereof. They may be used alone, and it is also possible to use a mixture of two or more kinds.

It is preferable that the above aromatic diamine curing agent is contained at 50 to 120 mass %, more preferably 60 to 120 mass %, and still more preferably 70 to 90 massa, of the stoichiometric amount of the entire epoxy resin. When the aromatic amine curing agent is 50 mass % or more of the stoichiometric amount of the entire epoxy resin, the resulting resin cured product has excellent heat resistance. In addition, in the case where the aromatic amine curing agent is 120 mass % or less, the toughness of the resulting resin cured product is improved.

In addition, for the purpose of promoting the curing of the epoxy resin, a curing accelerator may also be blended. Examples of curing accelerators include urea compounds, tertiary amines and salts thereof, imidazoles and salts thereof, triphenylphosphine and derivatives thereof, metal carboxylates, Lewis acid, and Bronsted acids and salts thereof.

In the matrix resin of the carbon fiber reinforced composite material of the present invention, a thermoplastic resin may be blended in order to improve the physical properties, such as toughness, of the resulting resin cured product. As such thermoplastic resins, those having both heat resistance and toughness can be preferably used, examples thereof including polysulfone, polyethersulfone, polyetherimide, polyimide, polyamide, polyamideimide, polyphenylene ether, a phenoxy resin, and a vinyl-based polymer.

Polyethersulfone and polyetherimide are particularly suitable because they can exhibit these effects without hardly impairing heat resistance.

In addition, with respect to the amount of thermoplastic resin blended, in the case where it is dissolved in an epoxy resin composition, the amount is preferably 1 to 40 parts by mass, more preferably 1 to 25 parts by mass, per 100 parts by mass of the epoxy resin. Meanwhile, in the case where it is dispersed and used, the amount is preferably 10 to 40 parts by mass, more preferably 15 to 30 parts by mass, per 100 parts by mass of the epoxy resin. When the thermoplastic resin satisfies the above blending amount, the toughness-improving effect is further improved. In addition, in the case where the thermoplastic resin does not exceed the above range, the resulting impregnation, tuck/drape, and heat resistance are excellent.

Particularly in order not to interfere with the prepreg production process centering on impregnation, it is preferable that the above thermoplastic resin is uniformly dissolved or microdispersed in particle form in the epoxy resin composition.

Further, in order to modify the matrix resin used in combination with the sizing agent coated carbon fiber of the present invention, it is also possible to blend thermosetting resins other than the thermosetting resin used in the matrix resin, an elastomer, a filler, rubber particles, thermoplastic resin particles, inorganic particles, and other additives.

As the thermoplastic resin particles, those same as the various thermoplastic resins mentioned above may be used. Among them, polyamide particles and polyimide particles are preferably used. Among polyamides, Nylon 12, Nylon 6, Nylon 11, Nylon 6/12 copolymers, and a nylon modified to have a semi-IPN (polymer interpenetrating network) with an epoxy compound (semi-IPN nylon) described in Example 1 of Japanese Patent Laid-open Publication No. 01-104624 are preferable. This is because they can impart particularly excellent adhesive strength with a thermosetting resin, whereby the carbon fiber reinforced composite material has high delamination strength at the time of drop-weight impact, resulting in a high improving effect on impact resistance.

The thermoplastic resin particles may have the shape of spherical particles, non-spherical particles, or porous particles. However, because a spherical shape prevents a decrease in flow characteristics of the resin, resulting in excellent viscoelasticity, and also does not provide a starting point for stress concentration, offering high impact resistance, the particles are spherical in a preferred mode.

As the rubber particles, in terms of handleability and the like, it is preferable to use cross-linked rubber particles and core-shell rubber particles composed of cross-linked rubber particles with a different kind of polymer graft-polymerized on the surface thereof.

In addition, in the matrix resin used in the present invention, without impairing the effects of the present invention, it is also possible to blend inorganic particles, such as silica, alumina, smectite, and synthetic mica for the adjustment of fluidity, such as the thickening of the matrix resin.

The prepreg of the present invention can be produced by a known method, such as a wet process in which the above matrix resin is dissolved in a solvent such as methyl ethyl ketone or methanol to reduce the viscosity, followed by impregnation, or a hot-melt process (dry process) in which the resin is heated to reduce the low viscosity, followed by impregnation.

Next, the carbon fiber reinforced resin composition containing a sizing agent coated carbon fiber and a matrix resin including a thermoplastic resin or a radically polymerizable resin according to a preferred embodiment of the present invention will be described.

In the present invention, the carbon fiber reinforced resin composition is obtained by impregnating the sizing agent coated carbon fiber described above or a sizing agent coated carbon fiber produced by the method described above with a matrix resin. When the sizing agent coated carbon fiber described above or a sizing agent coated carbon fiber produced by the method described above is used, a carbon fiber reinforced resin composition having excellent electrical insulation properties can be obtained; therefore, this is preferable.

As the matrix resin used in the carbon fiber reinforced resin composition of the present invention, a thermoplastic resin or a radically polymerizable resin is used.

As the thermoplastic resin, for example, it is preferable to use at least one thermoplastic resin selected from polyester-based resins such as polyethylene terephthalate (PET), polybutylene terephthalate (PBT), polytrimethylene terephthalate (PTT), polyethylene naphthalate (PEN), and liquid crystal polyester; polyolefin resins such as polyethylene (PE), polypropylene (PP), polybutylene, acid-modified polyethylene (m-PE), acid-modified polypropylene (m-PP), and acid-modified polybutylene; polyoxymethylene (POM), polyamide (PA), and polyarylene sulfide resins such as polyphenylene sulfide (PPS); polyketone (PK), polyetherketone (PEK), polyetheretherketone (PEEK), polyetherketoneketone (PEKK), polyethernitrile (PEN); fluorine-based resins such as polytetrafluoroethylene; crystalline resins such as liquid crystal polymers (LCP), polystyrene resins such as polystyrene (PS), acrylonitrile styrene (AS), and acrylonitrile styrene butadiene rubber (ABS), amorphous resins such as polycarbonate (PC), polymethyl methacrylate (PMMA), polyvinyl chloride (PVC), unmodified or modified polyphenylene ether (PPE), polyimide (PI), polyamideimide (PAI), polyetherimide (PEI), polysulfone (PSU), polyether sulfone, and polyarylate (PAR); a phenolic resin, a phenoxy resin, various thermoplastic elastomers such as a polystyrene-based elastomer, a polyolefine-based elastomer, a polyurethane-based elastomer, a polyester-based elastomer, a polyamide-based elastomer, a polybutadiene-based elastomer, a polyisoprene-based elastomer, an fluorine-based resin, and an acrylonitrile-based elastomer, copolymers and modification products thereof, and the like.

Among the above thermoplastic resins, in terms of heat resistance, it is preferable that the thermoplastic resin used in the carbon fiber reinforced resin composition of the present invention is a polyarylene sulfide resin, a polyimide resin, or a polyetherimide resin. In terms of strength, a polyamide resin is preferable. In terms of surface appearance, an amorphous resin such as polycarbonate is preferable. In terms of lightweight properties, a polyolefin-based resin is preferable.

Incidentally, without impairing the purpose of the carbon fiber reinforced resin composition, it is also possible to use a carbon fiber reinforced resin composition containing several kinds of these thermoplastic resins as the thermoplastic resin.

In the present invention, examples of radically polymerizable resins include an unsaturated polyester resin, a vinyl ester resin, a cyanate ester resin, and a bismaleimide resin. Among them, an unsaturated polyester resin and a vinyl ester resin are suitable.

An unsaturated polyester resin can be obtained from an unsaturated polybasic acid, or occasionally an unsaturated polybasic acid containing a saturated polybasic acid, and a polyhydric alcohol. An unsaturated polybasic acid may be used alone, and it is also possible to use a combination of two or more kinds. In addition, examples of saturated polybasic acids that partially substitute an unsaturated polybasic acid include phthalic acid, phthalic anhydride, isophthalic acid, terephthalic acid, hexahydrophthalic anhydride, azelaic acid, adipic acid, sebacic acid, and HET acid. These saturated polybasic acids may be used alone, and it is also possible to use a combination of two or more kinds.

Examples of polyhydric alcohols include ethylene glycol, diethylene glycol, propylene glycol, dipropylene glycol, trimethylene glycol, 1,2-butanediol, 1,3-butanediol, 1,4-butanediol, 1,2-pentanediol, 1,6-hexanediol, cyclohexane diol, neopentyl glycol, 2,2,4-trimethyl-1,3-pentanediol, glycerol monoallyl ether, bisphenol A, hydrogenated bisphenol A, a propylene oxide adduct of bisphenol A, an ethylene oxide adduct of bisphenol A, glycidylated bisphenol A, glycidylated bisphenol F, glycerol, trimethylolpropane, pentaerythritol, ethylene oxide, propylene oxide, and epichlorohydrin. These polyhydric alcohols may be used alone, or it is also possible to use a combination of two or more kinds.

In addition, for the weight reduction of a molding material, a thermoplastic resin may be contained in a radically polymerizable resin. For weight reduction, a thermoplastic resin composition that is solid at room temperature is preferable. In particular, a saturated polyester, a polyvinyl compound, a polyacetate, or a poly(meth)acrylate alone, or alternatively a combination thereof, can be preferably used. Among them, a poly(meth)acrylate is easy to handle and inexpensive, and thus can be most preferably used.

The amount of thermoplastic resin blended in the radically polymerizable resin is preferably 10 parts by mass or more, particularly 20 parts by mass or more, and is 60 parts by mass or less, particularly 40 parts by mass or less, per 100 parts by mass of the radically polymerizable resin. This is because when the amount of thermoplastic resin is more than 60 parts by mass, the strength in the case of being formed into a carbon fiber reinforced resin molded article decreases.

Without inhibiting the dynamic characteristics, the carbon fiber reinforced resin composition of the present invention may also contain components other than those described above according to the intended use and the like. In addition, a filler, an additive, and the like may also be contained. Examples of fillers and additives include inorganic fillers, flame retardants, electrically conductive agents, crystal nucleators, UV absorbers, antioxidants, vibration damping agents, antibacterial agents, insect repellents, deodorants, coloring inhibitors, heat stabilizers, release agents, antistatic agents, plasticizers, lubricants, colorants, pigments, foaming agents, and coupling agent.

It is preferable that the carbon fiber reinforced resin composition of the present invention is a carbon fiber reinforced resin composition composed of 1 to 80 mass % of a sizing agent coated carbon fiber and 20 to 99 mass % of a matrix resin.

Subsequently, the molding material and the carbon fiber reinforced resin molded article according to the carbon fiber reinforced resin composition of the present invention will be described. In the present invention, the carbon fiber resin composition may be used in the form of a molding material, such as pellets or a stampable sheet. In addition, in the present invention, the carbon fiber reinforced resin composition may be used as a molding material in any of the following forms (D), (E), (F), and (G).

Molding material (D): A columnar molding material, in which the carbon fiber is arranged in parallel such that the difference in angle between the axial direction thereof and the major axis line of the molding material is 20° or less, the content of carbon fiber having a length of 50% or less of the length of the molding material is 30 mass % or less, and the average two-dimensional orientation angle defined by a single fiber of the carbon fiber forming the molding material and another single fiber of the carbon fiber closest thereto is 10 to 80°.

Molding material (E): A molding material, in which the carbon fiber is in the form of a single fiber and substantially two-dimensionally oriented.

Molding material (F): A molding material in which the carbon fiber is in the form of a bundle and substantially two-dimensionally oriented.

Molding material (G): A prepreg.

Pellets will be described. "Pellets" generally refers to a material obtained by melt-kneading pellets made of a matrix resin and a continuous carbon fiber or a discontinuous carbon fiber cut to a specific length (chopped carbon fiber) in an extruder, followed by extrusion and pelletizing.

It is preferable that the method for producing a carbon fiber reinforced resin composition of the present invention includes: a step of coating a carbon fiber with a sizing agent, followed by a heat treatment at 240° C. or more for 60 to 3,000 seconds, thereby producing a sizing agent coated carbon fiber; and a step of blending the sizing agent coated carbon fiber with a matrix resin. The sizing agent coated carbon fiber can be obtained by the step of producing a sizing agent coated carbon fiber described above.

The method for blending the sizing agent coated carbon fiber of the present invention with a matrix resin is not limited. However, when the sizing agent coated carbon fiber and a matrix resin are melt-kneaded, the carbon fiber can be uniformly dispersed, and a molded article having excellent electrical insulation properties can be obtained.

The melt-kneading method is not particularly limited, and a known heat-melting mixer may be used. Specifically, a single-screw extruder, a twin-screw extruder, a twin-screw extruder combining them, a kneader/extruder, and the like are usable.

When the sizing agent coated carbon fiber is loaded into the above heat-melting mixer, the fiber may be used in the form of a continuous fiber or a discontinuous fiber cut to a specific length. In the case where the carbon fiber is loaded into the heat-melting mixer directly in the form of a continuous fiber (in the case of direct loading), the breakage of the carbon fiber is suppressed, and the fiber length can be ensured also in the molded article. As a result, a molded article having excellent dynamic characteristics can be obtained. In addition, because the step of cutting a carbon fiber can be omitted, the productivity is improved.

Examples of molding methods for the molding material include injection molding (injection compression molding, gas-assisted injection molding, insert molding, etc.), blow molding, rotation molding, extrusion molding, press molding, transfer molding, and filament-winding molding. Amon them, in terms of productivity, it is preferable to use injection molding. By such a molding method, a carbon fiber reinforced molded article can be obtained.

Subsequently, the molding materials (D) to (G) and the carbon fiber reinforced resin molded article will be described.

(Molding Material (D))

It is preferable that the carbon fiber reinforced resin composition of the present invention is a columnar molding material (D), in which the carbon fiber is arranged nearly parallel to the axial direction, and the length of the carbon fiber is substantially the same as the length of the molding material.

Subsequently, the molding material (D) and the carbon fiber reinforced resin molded article will be described. The molding material (D) is composed of the sizing agent coated carbon fiber described above and a matrix resin. As shown in FIG. 1, the molding material 1 is cylindrical, in which a plurality of carbon fibers 2 are arranged nearly parallel to the axial direction of the cylinder, and the periphery of the carbon fibers is covered with a matrix resin 3. That is, the carbon fibers 2 mainly constitute the cylindrical core structure, and the matrix resin 3 serves as a main component of the sheath structure covering the core structure composed of the carbon fibers 2. "Main component" indicates that the proportion of the component occupies 50% or more of the total. As long as the sheath-core structure is composed of the carbon fibers 2 and the matrix resin 3, the molding material 1 may have any shape. In addition to the cylindrical shape, the shape may also be prismatic, elliptic cylindrical, or the like.

Incidentally, as used herein, "arranged nearly parallel" means the state in which the major axis line of the carbon fibers 2 and the major axis line of the molding material 1 are in the same direction, and the difference in angle between the axis lines is preferably 20° or less, more preferably 10° or less, and still more preferably 5° or less.

In addition, it is preferable that the molding material 1 is long-fiber pellets, in which the length of the carbon fibers 2 and the length L of the molding material 1 are substantially the same. Incidentally, as used herein, the state "lengths are substantially the same" means that in the molding material 1 in pellet form, the carbon fibers 2 are not cut in the middle inside the pellets, or a carbon fiber 2 significantly shorter than the entire length of the molding material 1 is not substantially contained. It is not necessary to particularly limit the amount of carbon fiber shorter than the length L of the molding material 1. However, in the case where the content of carbon fiber having a length L of 50% or less of the length of the molding material 1 is 30 mass % or less, it is evaluated that a carbon fiber bundle significantly shorter than the entire length of the molding material 1 is not substantially contained. Further, it is preferable that the content of carbon fiber having a length of 50% or less of the length of the molding material 1 is 20 mass % or less. Incidentally, the entire length of the molding material 1 is the length L of the carbon fiber in the orientation direction in the molding material 1. When the carbon fibers 2 have the length similar to that of the molding material 1, the carbon fiber length in the molded article can be increased. As a result, excellent dynamic characteristics can be obtained.

It is preferable that the molding material (D) is used after cut to a length within a range of 1 to 50 mm. By processing to the above length, the fluidity and handleability during molding can be sufficiently enhanced. In addition, depending on the molding method, the molding material (D) may also be used in the form of a continuous, long fiber. For example, it is possible that the fiber is wound around a mandrel with heating as a thermoplastic yarn prepreg, thereby giving a roll-shaped molded article.

Figure 2:
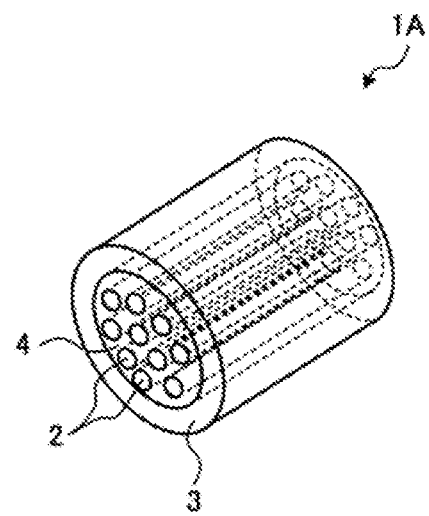
FIG. 2 is a perspective view showing another example of a molding material according to an embodiment of the present invention.

In addition, as the molding material (D), a material having an impregnation aid (H) between the carbon fibers 2 and the matrix resin 3 is suitable. FIG. 2 is a perspective view of a molding material 1A as the molding material (D). The molding material 1A is configured such that a plurality of carbon fibers 2 are arranged nearly parallel to the axial direction of a cylinder, and the periphery of the carbon fibers 2 is covered with an impregnation aid 4, while the periphery of the impregnation aid 4 is covered with a matrix resin 3. In order to improve the dynamic characteristics of the molded article obtained by molding the molding material, generally, it is preferable to use a high-molecular-weight matrix resin. However, a high-molecular-weight matrix resin is problematic in that it has high melt viscosity and thus is difficult to impregnate into a carbon fiber bundle. Meanwhile, in order to improve the impregnation of the matrix resin into a carbon fiber bundle, it is preferable to use a low-molecular-weight matrix resin having low melt viscosity. However, a molded article using a low-molecular-weight matrix resin has significantly reduced dynamic characteristics.

Thus, a resin having a relatively low molecular weight (prepolymer) is impregnated into a carbon fiber 2 bundle as an impregnation aid 4, and then a matrix resin 3 having a relatively high molecular weight is used as a matrix resin. Accordingly, a molding material having excellent dynamic characteristics can be productively produced.

Hereinafter, a preferred mode of the molding material (D) using an impregnation aid (H) will be described.

It is preferable that the impregnation aid (H) is 0.1 to 100 parts by mass per 100 parts by mass of the carbon fiber, more preferably 10 to 70 parts by mass, and still more preferably 15 to 30 parts by mass. When the impregnation aid (H) is 0.1 to 100 parts by mass per 100 parts by mass of the carbon fiber, a molding material having high dynamic characteristics can be productively produced.

The kind of impregnation aid (H) is not limited, but is preferably selected depending on the kind of matrix resin used. In the case where a polyarylene sulfide resin is used as a matrix resin, it is preferable to use polyarylene sulfide [d] (hereinafter abbreviated as PAS) as the impregnation aid (H). In the case where a polyamide resin is used as a matrix resin, it is preferable to use a phenol-based polymer as the impregnation aid (H). In the case where a polyolefin resin is used as the matrix resin, as the impregnation aid (H), it is preferable to use a mixture of [g]: a terpene-based resin or a first propylene-based resin having no acyl group on the side chain and [h]: a second propylene-based resin having an acyl group on the side chain.

Next, a preferred mode for producing a molding material (D) and a carbon fiber reinforced resin molded article will be described.

It is preferable that the method for producing a molding material (D) includes: a coating step of coating a continuous carbon fiber with the sizing agent; a strand formation step of impregnating the sizing agent coated carbon fiber with a molten matrix resin, thereby giving a continuous strand; and a cutting step of cooling and then cutting the strand, thereby giving a columnar molding material.

In addition, in the method for producing a molding material (D), the method for impregnating a sizing agent coated carbon fiber with a matrix resin is not limited. However, for example, a pultrusion molding method (pultrusion method), in which while pulling a sizing agent coated carbon fiber, the carbon fiber is impregnated with a matrix resin, can be mentioned. In a pultrusion method, a resin additive is added to the matrix resin as necessary, then, while pulling a continuous carbon fiber through a crosshead die, the matrix resin in a molten state is supplied from an extruder into the crosshead die to impregnate the continuous carbon fiber with the matrix resin, and the continuous carbon fiber impregnated with the molten resin is heated and cooled. The cooled strand is cut perpendicular to the pulling direction, thereby giving a molding material 1. In the molding material 1, carbon fibers having the same length are arranged parallel to each other in the length direction. Pultrusion molding basically involves impregnating a continuous carbon fiber bundle with a matrix resin while pulling the fiber. In addition to the above method in which while passing a carbon fiber bundle through a crosshead, a matrix resin is supplied from an extruder or the like to impregnate the fiber, it is also possible to use a method in which a carbon fiber bundle is passed through an impregnating bath containing an emulsion, suspension, or solution of a matrix resin and thereby impregnated with the resin, a method in which a matrix resin powder is sprayed to a carbon fiber bundle or a carbon fiber bundle is passed through a tank containing the powder, thereby attaching the matrix resin powder to the carbon fiber, and then the matrix resin is melted and impregnated into the fiber, or the like. The crosshead method is particularly preferable. In addition, although the resin impregnation operation in pultrusion molding is generally performed in one stage, the operation may also be divided into two or more stages, and it is also possible to separately perform an impregnation method.

According to the pultrusion method, carbon fibers can be uniformly arranged, and a carbon fiber reinforced resin molded article having excellent dynamic characteristics can be obtained; therefore, this is preferable.

In addition, with respect to the molding material containing an impregnation aid (H), it is preferable that the sizing agent coated carbon fiber is impregnated with the impregnation aid (H), and then the sizing agent coated carbon fiber impregnated with the impregnation aid (H) is impregnated with a matrix resin. For example, such a material is produced by covering a fiber with a matrix resin by the pultrusion molding method (pultrusion method) described above.

Examples of molding methods for the molding material (D) include injection molding (injection compression molding, gas-assisted injection molding, insert molding, etc.), extrusion molding, and press molding. Among them, injection molding is preferably used in terms of productivity. By such a molding method, a carbon fiber reinforced resin molded article can be obtained.

Molding Materials (E), (F))

In the present invention, it is preferable that the carbon fiber reinforced resin composition is a molding material (E), which is characterized in that the carbon fiber is in the form of a bundle and substantially two-dimensionally oriented, or a molding material (F), which is characterized in that the carbon fiber is in the form of a single fiber and substantially two-dimensionally oriented.

In the molding materials (E) and (F), a sizing agent coated carbon fiber refers to a continuous carbon fiber coated with a sizing agent, or alternatively a carbon fiber processed into a cloth in the form of a web, a nonwoven fabric, a felt, a mat, or the like and having applied thereto a sizing agent.

Subsequently, the method for producing a molding material (E) and (F) and a carbon fiber reinforced resin molded article will be described.

The molding material (E) and (F) is suitably produced by the two following methods.

The first method includes at least: a processing step of processing a carbon fiber into a cloth in the form of a web, a nonwoven fabric, a felt, or a mat; an application step of applying 0.1 to 10 parts by mass of the sizing agent to 100 parts by mass of the obtained cloth; and a compositing step of applying 20 to 99 mass % of a matrix resin to 1 to 80 mass % of the cloth having applied thereto the sizing agent, followed by compositing.

The second method includes at least: a coating step of coating 100 parts by mass of a carbon fiber with 0.1 to 10 parts by mass of the sizing agent, thereby giving a sizing agent coated carbon fiber; a cutting step of cutting the sizing agent coated carbon fiber obtained in the coating step to 1 to 50 mm; and a compositing step of mixing 1 to 80 mass % of the sizing agent coated carbon fiber cut in the cutting step and 20 to 99 mass % of matrix resin, followed by compositing.

First, the first method, which is a method for producing a molding material (E) in which the carbon fiber is in the form of a single fiber and substantially two-dimensionally oriented, will be described.

In the first method, a carbon fiber is processed into a cloth in the form of a web, a nonwoven fabric, a felt, or a mat (processing step). The cloth of a carbon fiber in the form of a web or the like can be produced by the dispersion processing of a carbon fiber bundle. As long as the carbon fiber is described above, the carbon fiber bundle may be composed of any of a continuous carbon fiber and a discontinuous carbon fiber. However, in order to achieve a better dispersion state, a discontinuous carbon fiber is preferable, and a chopped carbon fiber is more preferable.

The dispersion of a carbon fiber may be performed by a wet process or a dry process. As a wet process, a method in which the carbon fiber bundle is dispersed in water and subjected to papermaking can be mentioned. As a dry process, a method in which the carbon fiber bundle is dispersed in air, a method in which the carbon fiber bundle is dispersed using a carding device, or the like can be mentioned.

It is preferable that the areal weight of the sheet-shaped carbon fiber cloth produced as above is 10 to 500 g/m$^2$, more preferably 50 to 300 g/m$^2$. When the areal weight is less than 10 g/m$^2$, problems may occur in handleability, such as the breakage of the substrate, while when it is more than 500 g/m$^2$, it takes a long period of time to dry the substrate in a wet process, or the sheet may be thick in a dry process, making handling difficult in the subsequent process.

After the processing step, 0.1 to 10 parts by mass of the sizing agent is applied to 100 parts by mass of the carbon fiber sheet, which is the obtained cloth (application step). The sizing agent in the present invention is also referred to as "binder" in this first method. The sizing agent enhances the handleability of the carbon fiber during the step and also enhances the adhesion with the carbon fiber surface, whereby the electrical insulation properties can be enhanced. When the sizing agent is 0.1 parts by mass or more, the handleability of the carbon fiber sheet is improved, and the production efficiency of a molding material increases. In addition, when it is 10 parts by mass or less, the interface adhesion between the carbon fiber and the matrix resin increases.

Similarly to the application of a sizing agent to a carbon fiber described above, it is preferable that the application of a sizing agent to a carbon fiber sheet is performed using an aqueous solution, emulsion, or suspension containing the sizing agent. After the application, it is preferable that the excessive aqueous solution, emulsion, or suspension is removed by a method such as suction removal or absorption into an absorbent paper or like absorber.

In the application step, it is preferable that the carbon fiber sheet is heated after the application of a sizing agent. For the temperature and time of heating, the method for producing a sizing agent coated carbon fiber described above may be referred to.

In the compositing step, the carbon fiber sheet having applied thereto a sizing agent obtained in the application step is impregnated with a matrix resin, and the carbon fiber sheet and the matrix resin are composited, thereby giving a molding material.

In the first method, in the case where a thermoplastic resin is used as a matrix resin, the compositing of the matrix resin and the carbon fiber sheet having applied thereto a sizing agent can be performed by bringing the matrix resin into contact with the carbon fiber sheet. The form of the matrix resin in this case is not particularly limited, but is preferably at least one form selected from a textile, a nonwoven fabric, and a film. The style of contact is not particularly limited, and may be, for example, a style in which two textiles, nonwoven fabrics, or films of a matrix resin are prepared and disposed on the upper and lower sides of the carbon fiber sheet having applied thereto a sizing agent.

In the first method, it is preferable that the compositing of the matrix resin and the carbon fiber sheet having applied thereto a sizing agent is performed by pressurization and/or heating, and it is more preferable that both pressurization and heating are performed at the same time. It is preferable that the condition for pressurization is 0.01 MPa or more and 10 MPa or less, more preferably 0.05 MPa or more and 5 MPa or less. It is preferable that the condition for heating is a temperature at which the matrix resin is melted or can flow, and it is preferable that the temperature range is 50° C. or more and 400° C. or less, more preferably 80° C. or more and 350° C. or less. Pressurization and/or heating may be performed with the matrix resin being in contact with the carbon fiber sheet having applied thereto a sizing agent. For example, a method in which two textiles, nonwoven fabrics, or films of a matrix resin are prepared and disposed on the upper and lower sides of the carbon fiber sheet having applied thereto a sizing agent, and pressurization and/or heating is performed from both sides (a method in which the sheet is sandwiched in a double-belt pressing device, etc.), can be mentioned.

In the molding material (E) produced by the first method, the carbon fiber is in the form of a single fiber and substantially two-dimensionally orientated. "Two-dimensionally oriented" means that the average two-dimensional orientation angle defined by a single fiber of the carbon fiber forming the molding material and another single fiber of the carbon fiber closest thereto is 10 to 80°. The two-dimensional orientation angle can be measured by observing a molding material under an optical microscope or an electron microscope. In a molding material, the two-dimensional orientation angles of 400 carbon fibers are measured and averaged. When a carbon fiber is "substantially" two-dimensionally oriented, this means that out of the above 400 carbon fibers, 70% or more of the number of fibers, preferably 95% or more, and more preferably all the carbon fibers, are two-dimensionally oriented.

Subsequently, the second method, which is a method for producing a molding material (F) in which the carbon fiber is in the form of a bundle and substantially two-dimensionally oriented, will be described. The second method includes at least a coating step, a cutting step, and a compositing step.

In the coating step, the method for producing a sizing agent coated carbon fiber described above is used. In the cutting step, the sizing agent coated carbon fiber obtained in the coating step is cut to 1 to 50 mm. It is preferable that the length of the carbon fiber is 1 to 50 mm. This is because when the thickness is less than 1 mm, it may be difficult for the reinforcement and curing of the carbon fiber to be efficiently exhibited, while when it is more than 50 mm, it may be difficult to maintain the dispersion well. Cutting may be performed using a known method, such as a guillotine cutter or a roving cutter or like rotary cutter.

In the molding material (F) produced by the second method, the carbon fiber is in the form of a bundle and substantially two-dimensionally oriented. "Two-dimensionally orientated" has the same meaning as in the first method.

In the first method and the second method, as a matrix resin used in the compositing step, a thermoplastic resin or a thermosetting resin such as a radically polymerizable resin is used. Particularly in the first method, in terms of moldability, it is preferable to use a thermoplastic resin.

In the second method, in the case where a thermoplastic resin is used as a matrix resin, in order to ensure the fluidity during molding, a polymerizable monomer of the matrix resin may be blended. A polymerizable monomer of a matrix resin functions to enhance the moldability at the time of molding into a carbon fiber reinforced resin molded article. In addition, a polymerizable monomer enhances the wettability to a carbon fiber, and thus allows a larger amount of carbon fiber to be contained in the molding material. A polymerizable monomer is capable of forming a thermoplastic polymer at the time of polymerization. Such a polymerizable monomer is, for example, a molecule having one radically polymerizable carbon-carbon double bond in the molecule and having a molecular weight of 1,000 or less. When a polymerizable monomer having one carbon-carbon double bond in the molecule is used, in the case where a molding material containing the same is polymerized and cured, the resulting carbon fiber reinforced resin molded article is made of a non-crosslinked polymer and exhibits thermoplasticity.

Specific examples of usable polymerizable monomers of a matrix resin include (meth)acrylic monomers, such as aromatic vinyl including styrene and the like, vinyl acetate, vinyl chloride, maleic anhydride, maleic acid, fumaric acid, fumarate, methyl methacrylate, and methacrylic acid. As necessary, these monomers may be used alone, and it is also possible to use two or more kinds together. In addition, the polymerizable monomer of a matrix resin may be in the form of an oligomer of the above polymerizable monomer, as long as it can impart moderate fluidity to the molding material. Among them, a (meth)acrylic monomer having excellent weather resistance after curing is particularly preferable.

In the second method, in the case where a radically polymerizable resin is used as a matrix resin, it is used in the form of a sheet, such as a film prepared by uniformly coating a release film with a molten resin. The bundled sizing agent coated carbon fiber cut in the cutting step is uniformly dropped or spread over the sheet, and then a sheet similarly coated with a molten resin is attached thereto to sandwich the carbon fiber, thereby compositing them. The obtained sheet is heated for a predetermined period of time (e.g., at 40° C. for 24 hours) to thicken the matrix resin, whereby a sheet, which is a molding material, can be obtained.

In the second method, in the case where a thermoplastic resin is used as a matrix resin, similarly to the case of a radically polymerizable resin, the matrix resin is used in the form of a sheet, such as a film prepared by uniformly coating a release film with a molten resin. In the case where a matrix resin having blended therewith a polymerizable monomer is used, it is preferable that the viscosity is such that no liquid dripping occurs from the side of the release film. The bundled sizing agent coated carbon fiber cut in the cutting step is uniformly dropped or spread over the sheet coated with a matrix resin, then a sheet similarly coated with a molten resin is attached thereto to sandwich the carbon fiber, and they are composited (Molding Material (G))

In the present invention, one preferred molding material of the carbon fiber reinforced resin composition is a prepreg (G).

The prepreg (G) means a unidirectional prepreg having the sizing agent coated carbon fiber aligned in one direction.

It is preferable that the sizing agent coated carbon fiber is composed of a large number of filaments that are continuous over a length of 10 mm or more in at least one direction.

With respect to the prepreg (G), it is preferable that the width of the prepreg is 1 to 50 mm.

In addition, the method for impregnating a sizing agent coated carbon fiber with a matrix resin is not limited. However, a pultrusion method in which a matrix resin is melted, and then at least the continuous sizing agent coated carbon fiber obtained in the first step is passed therethrough and further widened, thereby forming a prepreg having a width of 1 to 50 mm, is preferable. When a sizing agent coated carbon fiber is continuously passed through a molten matrix resin and further widened, the carbon fiber can be uniformly arranged, making it possible to obtain a molded article having excellent electrical insulation properties.

In a pultrusion method, for example, a resin additive is added to a matrix resin as necessary and supplied in a molten state from an extruder to an impregnation die. By pulling a carbon fiber bundle through an impregnation die, it is possible that the molten resin supplied to the impregnation die is added to the carbon fiber bundle and then heated and impregnated into the fiber, and the carbon fiber bundle impregnated with the molten resin is cooled with pulling and then widened, thereby forming a tape-like prepreg.

In addition, as long as the prepreg (G) is formed of a sizing agent coated carbon fiber aligned in one direction and a matrix resin, the matrix resin may be in any of film form, particle form, fiber form, and the like.

As a matrix resin in film form, in addition to a coating film produced by coating a release paper with a molten resin, it is also possible to use a film produced by spinning a matrix resin into a fiber, cutting the fiber into short fibers, then dispersing the short fibers in a liquid, and preparing, from the dispersion, a short-fiber web in a papermaking manner in which fibers are randomly oriented.

The prepreg (G) can be produced by sandwiching a carbon fiber bundle aligned in one direction between coating films or short-fiber webs of a matrix resin from both sides, followed by heating.

In addition, as a prepreg containing a matrix resin in particle form, it is possible that a carbon fiber bundle aligned in one direction is passed in a resin slurry prepared by suspending a powder of the matrix resin in water to add the resin slurry to the carbon fiber bundle, then water adhering to the carbon fiber bundle is evaporated, and heating is performed to a temperature equal to or higher than the melting point of the matrix resin in particle form, thereby impregnating the resin into the carbon fiber.

The above resin slurry bath contains, for example, the resin in particle form within a range of 4 to 30 mass % in an aqueous solution, and may also contain 0.05 to 0.25 mass % of a surfactant that promotes mixing between the resin in particle form and water.

In addition, as the prepreg (G) containing a matrix resin in fiber form, a prepreg prepared by commingling a carbon fiber bundle and a matrix resin fiber can be mentioned. Commingling is performed as follows. A polymer fiber of a matrix resin installed on a bobbin rack or the like is fed to godet rolls through a fiber guide or the like, and, after coming out of the godet rolls, each fiber is passed through another fiber guide and then through a fiber comb. Meanwhile, a carbon fiber bundle is fed to godet rolls through a fiber guide or the like, and then, through another fiber guide, the width of the carbon fiber tow is uniformized in an air-opening device. The carbon fiber bundle and the polymer fiber that has passed through the fiber comb are mixed in a fixing rod for mixing, and then, in order to maintain the dimensional stability and the mixed state, the commingled prepreg is fed to a twist guide through a comb and then taken up. In order to ensure the complete commingled state of the prepreg, it is preferable that the polymer fiber and the carbon fiber are uniformly spread over the entire width, with the spread widths of them being substantially the same.

The prepreg (G) of the present invention is aligned in one direction in a desired mold and then press-molded with heating using a heating-type pressing machine or the like, and thereby formed into a carbon fiber reinforced resin molded article. In addition, it is also possible that after the prepreg is aligned in one direction in a desired mold, several layers of a different prepreg are laminated while changing the angle of the fiber axis direction, and then press-molded with heating using a heating-type pressing machine or the like, thereby forming the prepreg into a carbon fiber reinforced resin molded article.

The carbon fiber bundle does not have to be continuous over the entire length in the length direction of the laminate or over the entire width in the width direction of the laminate, and may be cut in the middle. Examples of forms of the carbon fiber bundle include a carbon fiber bundle formed of a large number of filaments, a cloth composed of such a carbon fiber bundle, a filament bundle having a large number of filaments arranged in one direction (unidirectional fiber bundle), and a unidirectional cloth composed of such a unidirectional fiber bundle. In terms of the productivity of a prepreg or a laminate, a cloth and a unidirectional fiber bundle are preferable. The carbon fiber bundle in a laminate may be composed of a plurality of fiber bundles in the same form, or alternatively may also be composed of a plurality of fiber bundles indifferent forms. As necessary, between the layers of laminated carbon fiber groups, another substrate is laminated (sandwich form).

Examples of applications of carbon fiber reinforced molded articles obtained by molding the carbon fiber reinforced resin composition and the molding material of the present invention include housings and inner components, such as trays and chassis, as well as cases thereof, of electric and electronic devices, such as personal computers, displays, OA appliances, mobile phones, personal digital assistants, facsimiles, compact discs, portable MDs, portable radio cassette recorders, PDA (personal digital assistants such as an electronic notebook), video cameras, digital still cameras, optical devices, audio devices, air conditioners, lighting devices, entertainment goods, toy goods, and other electrical appliances; mechanism elements; building materials such as panels; parts, components, and outer panels related to automobiles and two-wheeled vehicles, such as motor parts, alternator terminals, alternator connectors, IC regulators, potentiometer bases for light dimmers, suspension parts, various valves such as exhaust gas valves, various fuel-related, exhaust, or suction pipes, air intake nozzle snorkels, intake manifolds, various arms, various frames, various hinges, various bearings, fuel pumps, gas tanks, CNG tanks, engine cooling water joints, carburetor main bodies, carburetor spacers, exhaust gas sensors, cooling water sensors, oil temperature sensors, brake pad wear sensors, throttle position sensors, crank shaft position sensors, air flow meters, brake pat wear sensors, thermostat bases for air conditioners, heater warm air flow control valves, brush holders for radiator motors, water pump impellers, turbine vanes, wiper motor-related parts, distributors, starter switches, starter relays, wire harnesses for gear transmission, window washer nozzles, air conditioner panel switch boards, coils for fuel-related electromagnetic valves, connectors for fuses, battery trays, AT brackets, head lamp supports, pedal housings, handles, door beams, protectors, chassis, frames, armrests, horn terminals, stepping motor rotors, lamp holders, lamp reflectors, lamp housings, brake pistons, noise shields, radiator supports, spare tire covers, sheet shells, solenoid bobbins, engine oil filters, ignition device cases, undercovers, scuff plates, pillar trims, propeller shafts, wheels, fenders, facers, bumpers, bumper beams, bonnets, aero parts, plat forms, cowling louvers, roofs, instrument panels, spoilers, and various modules; aircraft-related parts, components, and outer panels, such as landing gear pods, winglets, spoilers, edges, rudders, elevators, fairings, and ribs; and windmill blades. They are particularly preferable for applications to airplane components, wind mill blades, automobile outer panels, and housings, trays, and chassis of electronic devices, for example.

Next, the laminated prepreg according a preferred embodiment of the present invention, which includes: at least two plies of a carbon fiber layer (b) containing a sizing agent coated carbon fiber (a); and a layer of a polymer resin (c) disposed between the two plies, will be described. The laminated prepreg is configured such that (i) the sizing agent coated carbon fiber (a) is the sizing agent coated carbon fiber described above, and (ii) a composite material having an interlayer structure obtainable by solidifying the laminated prepreg has a volume-specific resistance of 500 Ω·m or more in the thickness direction of the laminated prepreg.

Hereinafter, embodiments of the laminated prepreg, the method for producing the same, and the method for producing a carbon fiber reinforced composite material using the same of the present invention will be described in further detail.

The present invention is a laminated prepreg including: at least two plies of a carbon fiber layer (b) containing a sizing agent coated carbon fiber (a); and a layer of a polymer resin (c) disposed between the two plies. It is preferable that the laminated prepreg has the following characteristics.

(i) The sizing agent coated carbon fiber (a) is a carbon fiber coated with a sizing agent, the carbon fiber being configured such that when a carbon fiber cross-section is detected by energy-dispersive X-ray spectroscopy, a layer wherein the proportion of oxygen relative to all the elements is 4% or more is present in a thickness of 10 nm or more on a carbon fiber surface, the sizing agent containing (A) to (C) in a total amount of 80 mass % or more relative to the total amount of the sizing agent, the sizing agent coated carbon fiber being configured such that when the sizing agent coated carbon fiber is subjected to a 10-minute ultrasonic treatment in an acetone solvent three times, the amount of non-eluted sizing agent remaining on the carbon fiber is 0.1 part by mass or more and 0.25 parts by mass or less per 100 parts by mass of the sizing agent coated carbon fiber (a).

(ii) A carbon fiber reinforced composite material having an interlayer structure obtainable by solidifying the laminated prepreg has a volume-specific resistance of 500 Ω·m or more in the thickness direction of the laminated prepreg.

(A) At least one member selected from the group consisting of polyimide, polyetherimide, and polysulfone.

(B) A compound having a polar group and a terminal unsaturated group in a molecule.

(C) A polyether-type aliphatic epoxy compound and/or polyol-type aliphatic epoxy compound having an epoxy equivalent of 250 g/eq. or less and having two or more epoxy groups in a molecule.

The present inventors have conducted extensive research about the mechanism of insulation in the laminating direction of a carbon fiber reinforced composite material. As a result, they have found that with respect to a laminated prepreg in which a layer of a polymer resin (c) is disposed between carbon fiber layers (b) each containing a sizing agent coated carbon fiber (a) prepared by coating a carbon fiber having a specific surface structure with a sizing agent of specific composition, a carbon fiber reinforced composite material obtained by solidifying such a prepreg has high electrical insulation properties in the laminating direction, and thus accomplished the present invention.

In the laminated prepreg of the present invention, it has been confirmed that even if a carbon fiber configured such that when a carbon fiber cross-section is detected by energy-dispersive X-ray spectroscopy, a layer wherein the proportion of oxygen relative to all the elements is 4% or more is present in a thickness of 10 nm or more on a carbon fiber surface is used as the carbon fiber for the sizing agent coated carbon fiber (a), and the laminate structure of the laminated prepreg includes a layer of a polymer resin (c) between two plies of a carbon fiber layer (b), in the case where the sizing agent coated carbon fiber (a) is not configured such that when it is subjected to a 10-minute ultrasonic treatment in an acetone solvent three times, the amount of non-eluted sizing agent remaining on the carbon fiber is 0.1 part by mass or more and 0.25 parts by mass or less per 100 parts by mass of the sizing agent coated carbon fiber, the electrical insulation properties in the laminating direction of a carbon fiber reinforced composite material prepared by solidifying the laminated prepreg are not sufficient.

In addition, in the laminated prepreg of the present invention, it has been confirmed that even if the sizing agent coated carbon fiber (a) is configured such that when it is subjected to a 10-minute ultrasonic treatment in an acetone solvent three times, the amount of non-eluted sizing agent remaining on the carbon fiber is 0.1 part by mass or more and 0.25 parts by mass or less per 100 parts by mass of the sizing agent coated carbon fiber (a), and the laminate structure of the laminated prepreg includes a layer of a polymer resin (c) between two plies of a carbon fiber layer (b), in the case where a carbon fiber configured such that when a carbon fiber cross-section is detected by energy-dispersive X-ray spectroscopy, a layer wherein the proportion of oxygen relative to all the elements is 4% or more is present in a thickness of 10 nm or more on a carbon fiber surface is not used, the electrical insulation properties in the laminating direction of a carbon fiber reinforced composite material prepared by solidifying the laminated prepreg are not sufficient.

Further, it has been confirmed that in the case where the carbon fiber is configured such that when a carbon fiber cross-section is detected by energy-dispersive X-ray spectroscopy, a layer wherein the proportion of oxygen relative to all the elements is 4% or more is present in a thickness of 10 nm or more on a carbon fiber surface, and the sizing agent coated carbon fiber is configured such that when it is subjected to a 10-minute ultrasonic treatment in an acetone solvent three times, the amount of non-eluted sizing agent remaining on the carbon fiber is 0.1 part by mass or more and 0.25 parts by mass or less per 100 parts by mass of the sizing agent coated carbon fiber, if the laminate structure of the laminated prepreg does not include a layer of a polymer resin (c) between two plies of a carbon fiber layer (b), the electrical insulation properties in the laminating direction are lower as compared with the case where the layer of a polymer resin (c) is included.

That is, in the laminated prepreg of the present invention, it is important and preferable that the electrical insulation properties of the carbon fiber reinforced composite material are even higher when all the following conditions are satisfied: the carbon fiber is configured such that when a carbon fiber cross-section before coating with a sizing agent is detected by energy-dispersive X-ray spectroscopy, a layer wherein the proportion of oxygen relative to all the elements is 4% or more is present in a thickness of 10 nm or more on a carbon fiber surface; the total amount of the specific (A) to (C) described above is 80 mass % or more relative to the total amount of the sizing agent; the sizing agent coated carbon fiber is configured such that when it is subjected to a 10-minute ultrasonic treatment in an acetone solvent three times, the amount of non-eluted sizing agent remaining on the carbon fiber is 0.1 part by mass or more and 0.25 parts by mass or less per 100 parts by mass of the sizing agent coated carbon fiber; and the laminate structure of the laminated prepreg includes a layer of a polymer resin (c) between two plies of a carbon fiber layer (b).

The carbon fiber used as the sizing agent coated carbon fiber (a) used in the laminated prepreg of the present invention is the sizing agent coated carbon fiber described above or a sizing agent coated carbon fiber produced by the method described above. When the sizing agent coated carbon fiber described above or a sizing agent coated carbon fiber produced by the method described above of the present invention is used, a laminated prepreg having excellent electrical insulation properties and a carbon fiber reinforced composite material using the same can be obtained; therefore, this is preferable.

Next, the laminated prepreg of the present invention will be described.

Figure 3:
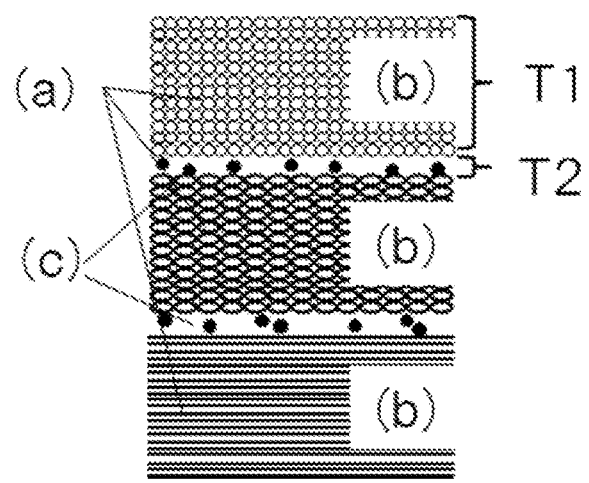
FIG. 3 is a schematic diagram showing an example of a cross-sectional view of a typical laminated prepreg.

FIG. 3 shows an example of a cross-sectional view of a typical laminated prepreg. The laminated prepreg will be described in further in detail using FIG. 3.

The laminated prepreg of the present invention includes: at least two plies of a carbon fiber layer (b) containing a sizing agent coated carbon fiber (a); and a layer of a polymer resin (c) disposed between the two plies. Because of such a structure, when the laminated prepreg is solidified, an insulating layer is periodically formed between the layers inside the carbon fiber reinforced composite material, and the carbon fiber reinforced composite material obtained exhibits high electrical insulation properties in the laminating direction.

Solidification means the state change from liquid to solid of the polymer resin impregnated into the carbon fiber layer (b) or of the matrix resin formed of the polymer resin forming the layer of a polymer resin (c). Specifically, it means cooling the thermoplastic resin, which has been heated to a temperature equal to or higher than the glass transition temperature, to a temperature equal to or lower than the glass transition temperature to make it solid, or reacting, curing, or crosslinking a thermosetting resin to make it solid. In a carbon fiber reinforced composite material prepared by solidifying the laminated prepreg, the carbon fiber layer is defined as a carbon fiber layer (b)', while the layer of a polymer resin is defined as a layer of a polymer resin (c)'.

In the laminated prepreg, when the layer of a polymer resin (c) is disposed between the carbon fiber layers (b), the carbon fiber reinforced composite material obtained by solidification has an interlayer structure. As a result, the contact of carbon fibers connecting between the two carbon fiber layers (b)' is reduced, whereby the electrical insulation properties of the carbon fiber reinforced composite material in the laminating direction are significantly improved.

In the carbon fiber reinforced composite material prepared by solidifying the laminated prepreg of the present invention, it is preferable that the ratio T1/T2 between the average thickness T1 of the carbon fiber layer (b)' and the average thickness T2 of the layer of a polymer resin (c)' is 9 or less, more preferably less than 8, and still more preferably less than 7. When T1/T2 is 9 or less, the proportion of the thickness of the layer of a polymer resin (c)' serving as an insulating layer increases relative to the entire thickness of the carbon fiber reinforced composite material in the laminating direction, resulting in an increase in electrical insulation properties of the carbon fiber reinforced composite material. The lower limit of T1/T2 is not particularly set, and 5 or less is sufficient.

The average thickness T1 of the carbon fiber layer (b)' and the average thickness T2 of the layer of a polymer resin) (c)' is determined as follows. The carbon fiber reinforced composite material prepared by solidifying the laminated prepreg is cut in the laminating direction to give a cross-section. From the cross-section, excluding the area between two carbon fiber layers arranged in the cutting direction, the thicknesses of other carbon fiber layers (b)' or layers of a polymer resin (c)' are measured.

It is preferable that the layer of a polymer resin (c) contains a thermosetting resin and a curing agent in a total amount 50 parts by mass or more, more preferably 70 parts by mass or more, per 100 parts by mass of the polymer resin in the layer. Generally, a thermosetting resin has higher electric resistance compared with a thermoplastic resin and improves the electrical insulation properties of the layer of a polymer resin (c)' as solidified, and thus is preferable.

It is preferable that the layer of a polymer resin (c) contains at least one thermoplastic resin selected from the group consisting of particles, fibers, and a film of a thermoplastic resin.

That is, because the layer of a polymer resin (c) contains particles, fibers, or a film of a thermoplastic resin, in the case where a laminated prepreg is solidified into a carbon fiber reinforced composite material, the carbon fiber at the interface of the carbon fiber layers (b)' is less likely to diffuse into the layer of a polymer resin (c)', whereby the amount of carbon fiber connecting between the layers of a polymer resin layer (c)' is reduced. As a result, the electrical insulation properties of the carbon fiber composite material in the laminating direction are increased; therefore, this is preferable.

It is preferable that the particles, fibers, and film of the thermoplastic resin contained in the layer of a polymer resin (c) are contained in an amount of 5 to 30 mass %, more preferably 10 to 30 mass %, and still more preferably 10 to 20 mass %, relative to the total amount of the polymer resin contained in the laminated prepreg. When the amount is 5 mass % or more, as described above, the thickness of the layer of a polymer resin (c)' in the carbon fiber reinforced composite material is maintained; therefore, this is preferable. In the case where the amount is 30 parts by mass or less, the proportion of resins other than the thermoplastic resin component in the layer of a polymer resin (c)' increases. As a result, the electrical insulation properties of the carbon fiber reinforced composite material are increased; therefore, this is preferable.

As particles of a thermoplastic resin, a thermoplastic resin usable as a mixture with a matrix resin may be used. Among them, polyamide is most preferable. Among polyamides, Nylon 12, Nylon 6, Nylon 11, Nylon 6/12 copolymers, and a nylon modified to have a semi-IPN (polymer interpenetrating network) impart particularly excellent adhesive strength with a matrix resin. The thermoplastic resin particles may have the shape of spherical particles, non-spherical particles, or porous particles. However, a spherical shape is preferable in that it prevents a decrease in flow characteristics of the resin, resulting in excellent viscoelasticity, and also does not provide a starting point for stress concentration, offering high impact resistance. Examples of commercially available products of polyamide particles include SP-500, SP-10, TR-1, TR-2, 842P-48, and 842P-80 (all manufactured by Toray Industries, Inc.), "Toraypearl®" TN (manufactured by Toray Industries, Inc.), and "Orgasole®" 1002D, 2001UD, 2001EXD, 2002D, 3202D, 3501D, and 3502D (all manufactured by Arkema Co.).

Examples of thermoplastic resin fibers include polyamide, polycarbonate, polyacetal, polyphenylene oxide, polyphenylene sulfide, polyarylate, polyacrylonitrile, polyester, polyamideimide, polyimide, polyetherimide, polysulfone, polyethersulfone, polyetheretherketone, polyaramide, and polybenzimidazole. Among them, polyamide, polyimide, polyamideimide, polyetherimide, polyethersulfone, and polysulfone provide excellent bond strength with a matrix resin and thus are preferable. Polyamide provides particularly excellent bond strength with a matrix resin and thus are more preferable.

A typical example of a film of the above thermoplastic resin is a thermoplastic resin having, on the main chain, a bond selected from a carbon-carbon bond, an amide bond, an imide bond, an ester bond, an ether bond, a carbonate bond, a urethane bond, a thioether bond, a sulfone bond, an imidazole bond, and a carbonyl bond. In particular, polyamide, polycarbonate, polyacetal, polyphenylene oxide, polyphenylene sulfide, polyarylate, polyacrylonitrile, polyester, polyamideimide, polyimide, polyetherimide, polysulfone, polyethersulfone, polyetheretherketone, polyaramide, and polybenzimidazole can be mentioned. Among them, polyamide, polyimide, polyamideimide, polyetherimide, polyethersulfone, and polysulfone provide excellent bond strength with a matrix resin and thus are preferable. Polyamide provides particularly excellent bond strength with a matrix resin and thus are more preferable.

It is preferable that a carbon fiber reinforced composite material obtained by solidifying the laminated prepreg of the present invention has a carbon fiber volume fraction (Vf) of 60 to 70%. When Vf is 70% or less, the proportion of the carbon fiber having lower electrical insulation properties as compared with a polymer resin decreases, whereby the electrical insulation properties of the carbon fiber reinforced composite material are improved; therefore, this is preferable. When Vf is 60% or more, the carbon fiber reinforced composite material has excellent elasticity and excellent strength; therefore, this is preferable.

Next, the laminated prepreg and the method for producing a carbon fiber reinforced composite material of the present invention will be described.

In the present invention, the prepreg is obtained by laminating a prepreg obtained by impregnating the sizing agent coated carbon fiber (a) described above or a sizing agent coated carbon fiber (a) produced by the method described above with a matrix resin. At the time of solidifying the laminated prepreg of the present invention, when sizing agent coated carbon fiber (a) described above or a sizing agent coated carbon fiber (a) produced by the method described above is used, a carbon fiber reinforced composite material having excellent electrical insulation properties can be obtained; therefore, this is preferable.

In the present invention, as the polymer resin to serve as a matrix resin impregnated into the carbon fiber layer (b), or as the polymer resin forming the layer of a polymer resin (c), a thermosetting resin and a thermoplastic resin are usable, and it is preferable to use a thermosetting resin.

Examples of thermosetting resins include resins such as an unsaturated polyester resin, a vinyl ester resin, an epoxy resin, a phenol resin, a melamine resin, a urea resin, a thermosetting polyimide resin, a cyanate ester resin, and a bismaleimide resin, modification products thereof, and resins composed of two or more kinds blended. Among them, it is preferable to use an epoxy resin, which has an excellent balance of mechanical characteristics and is advantageous in that cure shrinkage is small.

Epoxy compounds used for the epoxy resin are not particularly limited, and the compounds described above are used. In addition, the curing agent is not particularly limited, and the compounds described above can be used.

Among them, it is preferable to use an epoxy resin containing a polyfunctional glycidylamine-type epoxy resin and an aromatic diamine curing agent. Generally, a matrix resin containing a polyfunctional glycidylamine-type epoxy resin and an aromatic diamine curing agent has a high crosslinking density, and can improve the heat resistance and compressive strength of a carbon fiber reinforced composite material.

The polyfunctional glycidylamine-type epoxy resin and the aromatic diamine curing agent are not particularly limited, and the compounds described above are used alone or in combination.

It is preferable that the above aromatic diamine curing agent is contained at 50 to 120 mass %, more preferably 60 to 120 mass %, and still more preferably 70 to 90 mass %, of the stoichiometric amount of the entire epoxy resin. When the aromatic amine curing agent is 50 mass % or more of the stoichiometric amount of the entire epoxy resin, the resulting resin cured product has excellent heat resistance. In addition, in the case where the aromatic amine curing agent is 120 mass % or less, the toughness of the resulting resin cured product is improved.

In addition, a curing accelerator may be blended for the purpose of promoting the curing of an epoxy resin, and a thermoplastic resin may be blended in order to improve the physical properties, such as toughness, of the resulting resin cured product.

As the thermoplastic resin, the compounds described above are used.

Incidentally, without impairing the electrical insulation properties of the carbon fiber reinforced composite material, a laminated prepreg containing a plurality of kinds of these thermoplastic resins may be used.

Further, in order to modify the matrix resin used for the laminated prepreg of the present invention, the additives described above may be used.

The prepreg of the present invention can be produced by the known method described above.

The carbon fiber reinforced composite material having an interlayer structure of the present invention can be produced by solidifying the matrix resin by pressurizing and heating or heating-cooling the laminated prepreg of the present invention described above. As specific methods, it is possible to employ a press-molding method, an autoclave molding method, a sheet-winding molding method, an internal-pressure molding method, a vacuum-pressure molding method, or the like. By any of these molding methods, the laminated prepreg of the present invention can be solidified to give a carbon fiber reinforced composite material having high electrical insulation properties in the laminating direction.

EXAMPLES

Next, the present invention will be described in detail with reference to examples. However, the present invention is not limited to these examples.

(1) Energy-Dispersive X-Ray Spectroscopy of Carbon Fiber Cross-Section

The thickness of a high-oxygen-concentration region on the surface of a carbon fiber was measured by the following method.

From a carbon fiber, a slice having a thickness of about 100 nm was produced in the cross-sectional direction using a focused ion beam (FIB). In addition, the carbon fiber surface was protected with amorphous carbon. Arbitrary three points were observed under an atomic resolution analytical electron microscope device with a spot diameter of 0.2 nm or less using energy-dispersive X-ray spectroscopy as a detector. In the direction perpendicular to the circumference of the carbon fiber, the proportion of the element concentration of a 20-nm-wide area was measured from the inside of the carbon fiber toward the protection film. On the resulting line profile, the thickness at which the oxygen concentration reached 4% or more was defined as the thickness of the high-oxygen-concentration region on the surface of the carbon fiber.

(2) Photoelectron Take-Off Angle Dependence of Oxygen Concentration of Carbon Fiber Surface (O/C)

The oxygen concentration of the carbon fiber surface (O/C) was determined according to the following procedure by X-ray photoelectron spectroscopy. First, a carbon fiber, from which dirt adhering to the surface has been removed, is cut to about 20 mm and spread over a sample support table made of copper. Next, the sample support table was set in a sample chamber, and the inside of the sample chamber was maintained at $1\times10^{-8}$ Torr. Subsequently, using $AlK\alpha_{1,2}$ as the X-ray source, measurement was performed at photoelectron take-off angles of 10° and 90°. Incidentally, as a correction value for the peak accompanying electrification during measurement, the binding energy value of the main peak (peak top) of $C_{1s}$ was set at 284.6 eV. The $C_{1s}$ peak area was determined by drawing a straight baseline within a range of 282 to 296 eV. In addition, the $O_{1s}$ peak area was determined by drawing a straight baseline within a range of 528 to 540 eV. Here, the surface oxygen concentration is a value calculated as an atomic ratio using a device-specific sensitivity correction value from the ratio between the above $O_{1s}$ peak area and $C_{1s}$ peak area. ESCA-1600 manufactured by ULVAC-PHI was used as the X-ray photoelectron spectroscopy device. The device-specific sensitivity correction value was 2.33.

The ratio $(\beta)/(\alpha)$ between O/C at a photoelectron take-off angle of 10° ($\alpha$) and O/C at a photoelectron take-off angle of 90° ($\beta$) was defined as an index of the photoelectron take-off angle dependence of the oxygen concentration of the carbon fiber surface (O/C).

(3) Measurement Method for Amount of Sizing Agent Attached

About 2 g of a sizing adhesion carbon fiber bundle was weighed (W1) (read to four places of decimals) and then allowed to stand for 15 minutes in an electric furnace (volume: 120 cm³) at a temperature of 450° C. in a nitrogen gas stream of 50 ml/min, causing complete thermal decomposition of the sizing agent. Then, the carbon fiber bundle was transferred to a container in a dry nitrogen gas stream of 20 l/min, cooled for 15 minutes, and then weighed (W2) (read to four places of decimals). W1−W2 is calculated to determine the amount of sizing agent attached. The amount of sizing agent attached was converted into an amount per 100 parts by mass of the carbon fiber bundle (rounded off to two decimal places), and the obtained value was defined as the number of parts by mass of the attached sizing agent. The measurement was performed twice, and the average was defined as the number of parts by mass of the sizing agent.

(4) Washing of Sizing Agent on Sizing Agent Coated Carbon Fiber 2 g of a sizing agent coated carbon fiber was immersed in 50 ml of acetone and ultrasonically treated for 10 minutes. Subsequently, the sizing agent coated carbon fiber was taken out from acetone, immersed in 50 ml of different acetone, and ultrasonically treated for 10 minutes. The ultrasonic treatment was performed three times in total, followed by drying.

(5) Strand Tensile Strength and Elasticity of Carbon Fiber Bundle

The strand tensile strength and strand elasticity of a carbon fiber bundle were determined in accordance with JIS-R-7608 (2004), Resin-Impregnated Strand Test Method, according to the following procedure. The resin formulation was as follows: "Celloxide®" 2021P (manufactured by Daicel Chemical Industries, Ltd.)/boron trifluoride monoethylamine (manufactured by Tokyo Chemical Industry Co., Ltd.)/acetone=100/3/4 (part by mass). The curing conditions were as follows: normal pressure, temperature: 125° C., time: 30 minutes. Ten strands of a carbon fiber bundle were subjected to the measurement, and the averages were defined as the strand tensile strength and the strand elasticity, respectively.

(6) Definition of 0° for Carbon Fiber Reinforced Composite Material

As described in JIS K7017 (1999), in a unidirectional carbon fiber reinforced composite material, the fiber direction was taken as the axial direction, and the axial direction was defined as the 0° axis, while the direction orthogonal to the axis was defined as 90°.

(7) Electrical Insulation Properties of Carbon Fiber Reinforced Composite Material 24 plies of each unidirectional prepreg were pseudo-isotropically laminated in a $[+45°/0°/-45°/90°]_{3s}$ configuration, and molded in an autoclave at a temperature of 180° C. for 2 hours at a pressure of 0.59 MPa and a heating rate of 1.5° C./min, thereby producing a laminate. From each of the laminates, a sample 50 mm in length×50 mm in width was cut, and both sides of the sample were coated with an electrically conductive paste "Dotite®" D-550 (manufactured by Fujikura Kasei Co., Ltd.). The resistance in the laminating direction of each sample was measured by a four-terminal method using an R6581 digital multimeter manufactured by Advantest Corporation to determine the volume-specific resistance.

When respect to the volume-specific resistance when the volume fraction of the carbon fiber of the carbon fiber reinforced composite material used for measurement was 70%, a resistance of 5,000 Ωcm or more was rated as A, 1,000 Ωcm or more and less than 5,000 Ωcm was rated as B, 600 Ωcm or more and less than 1,000 Ωcm was rated as C, 300 Ωcm or more and less than 600 Ωcm was rated as D, and less than 300 Ωcm was rated as E. The range of A to D is preferable in the present invention.

(8) Measurement of Interlayer Thickness of Carbon Fiber Reinforced Composite Material The sample for the measurement of electrical insulation properties produced in (7) above was cut in the 0° direction and the 90° direction to give two cross-sections. From each cross-section, excluding the area between two carbon fiber layers arranged in the cutting direction, the thicknesses of other carbon fiber layers (b)' or layers of a polymer resin (c)' were measured. The measurement was performed at 20 points per interlayer region. Two or more interlayer thicknesses were averaged and defined as the interlayer thickness.

(6) Volume Specific Resistance Value of Carbon Fiber Composite Material (Electrical Insulation Properties)

Using a molding die having an inner dimension of 12.7 mm in width×65 mm in length×2 mm in thickness (hereinafter, the width, length, and thickness were defined as sides A, B, and C, respectively, and the directions parallel to these sides are defined as directions a, b, and c, respectively; in addition, the plane of a rectangle having the sides A and B is defined as a plane AB, and other planes (BC, CA) are also defined in the same manner), injection molding was performed through a fan gate located to contact one side C of the plane BC of the molding die (gate size: 5 mm in the direction b, 2 mm in the direction c), and the obtained molded article was used as a specimen. Next, the two planes AB of the molded specimen were coated with an electrically conductive paste (Dotite manufactured by Fujikura Kasei Co., Ltd.). After the electrically conductive paste was sufficiently dried, measurement was performed under an absolute dry condition (moisture content: 0.05% or less). For the measurement, electrodes were pressure-bonded to the two planes AB, and the electric resistance value between the electrodes was measured using a digital multimeter (R6581 manufactured by Advantest Corporation). The contact resistances with the measuring device, jig, and the like were subtracted from the electric resistance value, and the difference was multiplied by the area of the electrically conductive paste-coated planes. Next, the product was divided by the specimen length, and the quotient was defined as the specific resistance value (unit: $\Omega \cdot m$). Incidentally, in this measurement, ten samples were measured, and the average was used.

$1.0 \times 10^3$ $\Omega m$ or more was rated as A, $1.0 \times 10^2$ $\Omega cm$ or more was rated as B, 1.0 $\Omega cm$ or more was rated as C, and 1.0 $\Omega cm$ or less was rated as D. The range of A and B is preferable in the present invention.

Materials and components used in the examples and comparative examples are as follows.

Component (A)

A-1: Mixture of a Pyromellitic Anhydride Monomer as Polyamic Acid and 4,4'-oxydiphenylene Component (B)

B-1: UA101H (Manufactured by Kyoeisha Chemical Co., Ltd.)

Glycerol dimethacrylate hexamethylene diisocyanate
The number of terminal unsaturated groups: 4

Component (C)

C-1: "Denacol (Registered Trademark)" EX-611 (Manufactured by Nagase ChemteX Corporation)

Sorbitol polyglycidyl ether
Epoxy equivalent: 167 g/mol, the number of epoxy groups: 4
The number of hydroxyl groups: 2

C-2: "Denacol (Registered Trademark)" EX-521 (Manufactured by Nagase ChemteX Corporation)

Polyglycerol polyglycidyl ether
Epoxy equivalent: 183 g/mol, the number of epoxy groups: 3 or more Additional Components of Sizing Agent D-1: Diglycerol-S (Manufactured by Sakamoto Yakuhin Kogyo Co., Ltd.), Diglycerol D-2: Prepared by Heat-Stirring and Hydrolyzing a 15 Mass % Aqueous Solution of C-2 to an Epoxy Equivalent of 400 g/Mol Component (E)

E-1: Tetraglycidyl diaminodiphenylmethane "Sumi-Epoxy®" ELM434 (Manufactured by Sumitomo Chemical Co., Ltd.)

Epoxy equivalent: 120 g/eq.

E-2: "jER®" 828 (Manufactured by Mitsubishi Chemical Corporation)

Bisphenol-A diglycidyl ether
Epoxy equivalent: 189 g/eq.

Component (F)

F-1: "SEIKACUREO" S (4,4'-diaminodiphenylsulfone, Manufactured by Wakayama Seika Corporation)

Thermoplastic Resin (G)

G-1: "SUMIKAEXCEL®" 5003P (polyethersulfone, Manufactured by Sumitomo Chemical Co., Ltd.)

Additive Component (I)

I-1: Nylon 12 Particles SP-10 (Manufactured by Toray Industries, Inc.)

Matrix Resin (J)

As long-fiber pellets, the following product was used
Polyarylene sulfide (PPS) resin pellets: "Torelina®" A900 (manufactured by Toray Industries, Inc.)
As short-fiber pellets, the following product was used.
Polyphenylene sulfide (PPS) resin pellets: "Torelina®" M2888 (manufactured by Toray Industries, Inc.).

Component (H)

H-1: Polyphenylene Sulfide Prepolymer Prepared in the Following Reference Example 1

Reference Example 1

<Preparation of Polyphenylene Sulfide Prepolymer: H-1>

118 kg (1,000 mol) of 47.5% sodium hydrosulfide, 42.3 kg (1,014 mol) of 96% sodium hydroxide, 163 kg (1,646 mol) of N-methyl-2-pyrrolidone (hereinafter sometimes abbreviated as NMP), 24.6 kg (300 mol) of sodium acetate, and 150 kg of ion exchange water were charged in a 1,000-1 autoclave equipped with a stirrer. The mixture was gradually heated to 240° C. over 3 hours under normal pressure through nitrogen, and 211 kg of water and 4 kg of NMP were distilled through the fractionating column. Subsequently, the reaction vessel was cooled to 160° C. Incidentally, during this deliquoring operation, 0.02 mol of hydrogen sulfide per mol of the charged sulfur component was dispersed out of the system.

Next, 147 kg (1,004 mol) of p-dichlorobenzene and 129 kg (1,300 mol) of NMP were added, and the reaction vessel was hermetically sealed in nitrogen gas. The mixture was heated to 270° C. at a rate of 0.6° C./min with stirring at 240 rpm, and held at this temperature for 140 minutes. While pressing 18 kg (1,000 mol) of water thereinto over 15 minutes, the mixture was cooled to 250° C. at a rate of 1.3° C./min. Subsequently, the mixture was cooled to 220° C. at a rate of 0.4° C./min, and then rapidly cooled to near room temperature, thereby giving a slurry (J). The slurry (J) was diluted with 376 kg of NMP to give a slurry (K). 14.3 kg of the slurry (K) heated to 80° C. was separated by filtration through a sieve (80 mesh, mesh size: 0.175 mm), thereby giving a crude PPS resin and 10 kg of a slurry (L). The slurry (L) was charged into a rotary evaporator. After purging with nitrogen, the slurry was treated under reduced pressure at 100 to 160° C. for 1.5 hours and then treated in a vacuum dryer at 160° C. for 1 hour. The amount of NMP in the obtained solid was 3 mass %.

12 kg of ion exchange water was added to the solid (1.2 times the amount of slurry (L)) and then stirred at 70° C. for 30 minutes to form a slurry again. The slurry was suction-filtered through a glass filter having a mesh size of 10 to 16 μm. 12 kg of ion exchange water was added to the obtained white cake, stirred at 70° C. for 30 minutes to form a slurry again, similarly suction-filtrated, and then vacuum-dried at 70° C. for 5 hours to give 100 g of a polyphenylene sulfide oligomer. The above operation was repeated until the polyphenylene sulfide prepolymer reached a predetermined amount.

4 g of the obtained polyphenylene sulfide oligomer was isolated and subjected to Soxhlet extraction with 120 g of chloroform for 3 hours. Chloroform was distilled off from the obtained extract, and 20 g of chloroform was added again to the obtained solid, followed by dissolution at room temperature, thereby giving a slurry-like liquid mixture. 250 g of methanol was slowly added dropwise thereto with stirring, then the precipitate was suction-filtered through a glass filter having a mesh size of 10 to 16 μm, and the obtained white cake was vacuum-dried at 70° C. for 3 hours to give a white powder.

The mass average molecular weight of the white powder was 900. From the absorption spectrum of the white powder in infrared spectroscopic analysis, the white powder turned out to be polyphenylene sulfide (PAS). In addition, as a result of the analysis of the thermal characteristics of the white powder using a differential scanning calorimeter (heating rate: 40° C./min), the white powder turned out to show broad heat absorption at about 200 to 260° C. and have a peak temperature of 215° C.

In addition, as a result of the mass spectrum analysis of components separated by high-performance liquid chromatography and also from the molecular weight information according to MALDI-TOF-MS, it turned out that the white powder is a mixture of a cyclic polyphenylene sulfide having 4 to 11 repeating units and a linear polyphenylene sulfide having 2 to 11 repeating units, and that the mass ratio between the cyclic polyphenylene sulfide and the linear polyphenylene sulfide is 9:1.

Reference Example 2

The carbon fiber serving as a raw material was produced as follows.

A copolymer composed of 99 mol % acrylonitrile and 1 mol % itaconic acid was dry-wet spun and calcined to give a carbon fiber F having the following properties: total number of filaments: 24,000, total fineness: 1,000 tex, strand tensile strength: 5.9 GPa, strand tensile elasticity: 295 GPa. Next, the carbon fiber was surface-treated employing the electrolyte current density, temperature, and electrical quantity shown in Table 1, thereby giving carbon fibers A, B, D, and E having the physical properties shown in Table 1.

Reference Example 3

The carbon fiber serving as a raw material was produced as follows.

A copolymer composed of 99 mol % acrylonitrile and 1 mol % itaconic acid was dry-wet spun to give a carbon fiber having the following properties: total number of filaments: 24,000, total fineness: 1,000 tex. Next, the carbon fiber was surface-treated employing the electrolyte current density, temperature, and electrical quantity shown in Table 1, thereby giving a carbon fiber C having the physical properties shown in Table 1. In addition, the strand tensile strength was 2.8 GPa, and the tensile elasticity was 390 GPa.

TABLE 1

|  |  | Carbon Fiber A | Carbon Fiber B | Carbon Fiber C | Carbon Fiber D | Carbon Fiber E | Carbon Fiber F |
| --- | --- | --- | --- | --- | --- | --- | --- |
| Surface treatment | Electrical quantity | 200 C/g | 500 C/g | 700 C/g | 10 C/g | 20 C/g | — |
|  | Kind of electrolyte | Ammonium bicarbonate | Ammonium bicarbonate | Sulfuric acid | Sulfuric acid | Ammonium bicarbonate | — |
|  | Current density (A/m$^2$) | 5 | 2 | 4 | 10 | 10 | — |
|  | Temperature | 40 | 25 | 40 | 25 | 25 | — |
| Oxide layer thickness (nm) |  | 15 | 20 | 20 | 5 | 5 | <1 |
| Surface oxygen concentration (O/C) ($\beta$)/($\alpha$) |  | 0.9 | 0.9 | 0.88 | 0.7 | 0.7 | 0.9 |

Example 1

Step I: Step of attaching a Sizing Agent to a Carbon Fiber

An acetone solution containing 10 parts by mass of (A-1) as a component (A) and 90 parts by mass of (C-2) as a component (C) was prepared. The carbon fiber A was coated with this sizing agent by an immersion method and then heat-treated at a temperature of 240° C. for 70 seconds, thereby giving a sizing agent coated carbon fiber. The amount of sizing agent attached was adjusted to 1.0 mass % relative to the sizing agent coated carbon fiber. Subsequently, the remaining sizing agent after the elution of acetone was measured. The results are summarized in Table 2.

Step II: Production, Molding, and Evaluation of a Prepreg

Using a kneading device, 10 parts by mass of "Sumika-Excel®" 5003P was blended with 80 parts by mass of (E-1) and 20 parts by mass of (E-2) as components (E) and dissolved. Subsequently, 40 parts by mass of 4,4'-diaminodiphenylsulfone (F-1) as a curing agent (F) component was kneaded, thereby producing an epoxy resin composition for a carbon fiber reinforced composite material.

A release paper was coated with the obtained epoxy resin composition using a knife coater to a resin areal weight of 27 g/m$^2$, thereby producing a resin film. The resin film was placed on each side of the sizing agent coated carbon fiber (areal weight: 190 g/m$^2$) of Example 1 aligned in one direction. Then, with heating and pressurizing using a heat roller at a temperature of 100° C. and an atmospheric pressure of 1 atm, the sizing agent coated carbon fiber was impregnated with the epoxy resin composition, thereby giving a prepreg. The obtained carbon fiber-resin composite material had high electrical insulation properties. In addition, the Vf of the carbon fiber-resin composite material was 70%.

Examples 2 to 4

Step I: Step of Attaching a Sizing Agent to a Carbon Fiber

A sizing agent coated carbon fiber was obtained in the same manner as in Example 1, except that the carbon fiber, the sizing agent, and the heat treatment conditions were as shown in Table 2. Then, the sizing agent remaining after the elution of acetone was measured.

Step II: Production, Molding, and Evaluation of a Prepreg

A prepreg was produced, molded, and evaluated in the same manner as in Example 1. The obtained carbon fiber-resin composite material had high electrical insulation properties. The results are shown in Table 2.

Example 5

Step I: Step of Attaching a Sizing Agent to a Carbon Fiber

A sizing agent coated carbon fiber was obtained in the same manner as in Example 3. From the sizing agent coated carbon fiber wound around a bobbin, the carbon fiber was run at a speed of 1 m/min and wound up on the other bobbin. At this time, the bobbin was turned once in 2 minutes, thereby providing the sizing agent coated carbon fiber with a twist of 0.5 turn/m.

Step II: Production, Molding, and Evaluation of a Prepreg

A prepreg was produced, molded, and evaluated in the same manner as in Example 1. The value of the electrical insulation properties of the obtained carbon fiber-resin composite material was slightly lower than in Example 3, but still high. The results are shown in Table 2.

TABLE 2

|  |  | Example 1 | Example 2 | Example 3 | Example 4 | Example 5 | Example 6 |
|---|---|---|---|---|---|---|---|
| Carbon Fiber | | Carbon Fiber A | Carbon Fiber A | Carbon Fiber B | Carbon Fiber C | Carbon Fiber B | Carbon Fiber B |
| Sizing agent remaining after the elution of acetone (part by mass*) | | 0.15 | 0.16 | 0.18 | 0.19 | 0.18 | 0.18 |
| Sizing agent | Component (A) (A-1) (part by mass) | 10 | 90 | | | | |
| | Component (B) (B-1) (part by mass) | | | 50 | | 50 | 35 |
| | Component (C) (C-1) (part by mass) | | 10 | | 10 | | |
| | (C-2) (part by mass) | 90 | | 50 | 90 | 50 | 50 |
| Additional component | (D-1) (part by mass) | | | | | | 15 |
| | (D-2) (part by mass) | | | | | | |
| | (A) + (B) + (C) (mass %) | 100 | 100 | 100 | 100 | 100 | 85 |
| Heat treatment | Temperature (° C.) | 245 | 280 | 245 | 245 | 245 | 245 |
| | Time (sec) | 70 | 70 | 70 | 70 | 70 | 70 |
| Twist [turn/m] | | 0 | 0 | 0 | 0 | 0.5 | 0 |
| Electrical insulation properties | | D | C | B | B | C | c |

*"Sizing agent remaining after the elution of acetone" is the number of parts by mass per 100 parts by mass of sizing agent coated carbon fiber.

Comparative Example 1

Step I: Step of Attaching a Sizing Agent to a Carbon Fiber

A sizing agent coated carbon fiber was obtained in the same manner as in Example 1, except that 60 parts by mass of (C-1) was used as a component (C), and 40 parts by mass of (D-1) was used as an additional component. Then, the sizing agent remaining after the elution of acetone was measured.

Step II: Production, Molding, and Evaluation of a Prepreg

A prepreg was produced, molded, and evaluated in the same manner as in Example 1. The obtained carbon fiber-resin composite material had low electrical insulation properties. The results are shown in Table 3.

Comparative Example 2

Step I: Step of Attaching a Sizing Agent to a Carbon Fiber

A sizing agent coated carbon fiber was obtained in the same manner as in Example 1, except that 100 parts by mass of (D-1) was used as an additional component, and the carbon fiber B was used. Then, the sizing agent remaining after the elution of acetone was measured.

Step II: Production, Molding, and Evaluation of a Prepreg

A prepreg was produced, molded, and evaluated in the same manner as in Example 1. The obtained carbon fiber-resin composite material had low electrical insulation properties. The results are shown in Table 3.

Comparative Example 3

Step I: Step of Attaching a Sizing Agent to a Carbon Fiber

A sizing agent coated carbon fiber was obtained in the same manner as in Example 1, except that 100 parts by mass of (D-1) was used as an additional component, and the carbon fiber B was used. Then, the sizing agent remaining after the elution of acetone was measured.

Step II: Production, Molding, and Evaluation of a Prepreg

A prepreg was produced, molded, and evaluated in the same manner as in Example 1. The obtained carbon fiber-resin composite material had low electrical insulation properties. The results are shown in Table 3.

Comparative Example 4

Step I: Step of Attaching a Sizing Agent to a Carbon Fiber

A sizing agent coated carbon fiber was obtained in the same manner as in Example 1, except that 10 parts by mass of (A-1) was used as a component (A), 90 parts by mass of (C-1) was used as a component (C), and the carbon fiber D was used. Then, the sizing agent remaining after the elution of acetone was measured.

Step II: Production, Molding, and Evaluation of a Prepreg

A prepreg was produced, molded, and evaluated in the same manner as in Example 1. The obtained carbon fiber-resin composite material had low electrical insulation properties. The results are shown in Table 3.

Comparative Example 6

Step I: Step of Attaching a Sizing Agent to a Carbon Fiber

A sizing agent coated carbon fiber was obtained in the same manner as in Example 1, except that 10 parts by mass of (B-1) was used as a component (B), 90 parts by mass of (C-2) was used as a component (C), and the carbon fiber F was used. Then, the sizing agent remaining after the elution of acetone was measured.

Step II: Production, Molding, and Evaluation of a Prepreg

A prepreg was produced, molded, and evaluated in the same manner as in Example 1. The obtained carbon fiber-resin composite material had low electrical insulation properties. The results are shown in Table 3.

Comparative Example 7

Step I: Step of Attaching a Sizing Agent to a Carbon Fiber

A sizing agent coated carbon fiber was obtained in the same manner as in Example 1, except that 90 parts by mass of (A-1) was used as a component (A), 10 parts by mass of (C-1) was used as a component (C), and the carbon fiber A was used. Then, the sizing agent remaining after the elution of acetone was measured.

Step II: Production, Molding, and Evaluation of a Prepreg

A prepreg was produced, molded, and evaluated in the same manner as in Example 1. The obtained carbon fiber-resin composite material had low electrical insulation properties. The results are shown in Table 3.

TABLE 3

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Carbon Fiber |  |  | Carbon Fiber A | Carbon Fiber B | Carbon Fiber B | Carbon Fiber D | Carbon Fiber E | Carbon Fiber F | Carbon Fiber A |
| Sizing agent remaining after the elution of acetone (part by mass*) |  |  | 0.08 | 0.02 | 0.04 | 0.1 | 0.1 | 0.08 | 0.08 |
| Sizing agent | Component (A) | (A-1) (part by mass) |  |  |  | 10 |  |  | 90 |
|  | Component (B) | (B-1) (part by mass) |  |  |  |  | 10 | 10 |  |
|  | Component (C) | (C-1) (part by mass) | 60 |  |  | 90 | 90 |  | 10 |
|  |  | (C-2) (part by mass) |  |  |  |  |  | 90 |  |
|  | Additional component | (D-1) (part by mass) | 40 | 100 |  |  |  |  |  |
|  |  | (D-2) (part by mass) |  |  | 100 |  |  |  |  |
|  | (A) + (B) + (C) (mass %) |  | 60 | 0 | 0 | 100 | 100 | 100 | 100 |
| Heat treatment | Temperature (° C.) |  | 245 | 245 | 245 | 245 | 245 | 245 | 230 |
|  | Time (sec) |  | 70 | 70 | 70 | 70 | 70 | 70 | 40 |
| Twist [turn/m] |  |  | 0 | 0 | 0 | 0 | 0 | 0 | 0 |
| Electrical insulation properties |  |  | E | E | E | E | E | E | E |

*"Sizing agent remaining after the elution of acetone" is the number of parts by mass per 100 parts by mass of sizing agent coated carbon fiber.

Comparative Example 5

Step I: Step of Attaching a Sizing Agent to a Carbon Fiber

A sizing agent coated carbon fiber was obtained in the same manner as in Example 1, except that 10 parts by mass of (B-1) was used as a component (B), 90 parts by mass of (C-1) was used as a component (C), and the carbon fiber E was used. Then, the sizing agent remaining after the elution of acetone was measured.

Step II: Production, Molding, and Evaluation of a Prepreg

A prepreg was produced, molded, and evaluated in the same manner as in Example 1. The obtained carbon fiber-resin composite material had low electrical insulation properties. The results are shown in Table 3.

Example 7

This example includes the following steps I to III.

Step I: Step of Attaching a Sizing Agent to a Carbon Fiber

An acetone solution containing 10 parts by mass of (A-1) as a component (A) and 90 parts by mass of (C-2) as a component (C) was prepared. The carbon fiber A was coated with this sizing agent by an immersion method and then heat-treated at a temperature of 240° C. for 70 seconds, thereby giving a sizing agent coated carbon fiber. The amount of sizing agent attached was adjusted to 1.0 mass % relative to the sizing agent coated carbon fiber. Subsequently, the remaining sizing agent after the elution of acetone was measured. The results are summarized in Table 4.

Step II: Step of Producing Long-Fiber Pellets

At an end portion of a single-screw extruder, a crosshead die processed into a wave shape that allows for the passage of a continuous sizing agent coated carbon was installed. Next, while pulling a continuous sizing agent coated carbon fiber at a speed of 5 m/min through the crosshead die, PPS resin pellets in a molten state were supplied to the crosshead die from an extruder, thereby impregnating the continuous sizing agent coated carbon fiber with the PPS resin. After cooling, the fiber was cut to 7 mm in the direction perpendicular to the pulling direction, thereby giving long-fiber pellets, in which the carbon fiber was arranged nearly parallel to the axial direction, and the length of the carbon fiber was substantially the same as the length of the molding material. Incidentally, in the extruder, kneading was sufficiently performed at a barrel temperature of 320° C. and a rotation speed of 150 rpm, followed by degassing from a downstream vacuum vent. The supply of the PPS resin pellets was adjusted so that the amount of sizing agent coated carbon fiber was 20 parts by mass relative to 80 parts by mass of the PPS resin.

Step III: Injection Molding Step

Using an injection molding machine J350EIII manufactured by Japan Steel Works, Ltd., the long-fiber pellets obtained in the previous step were molded into a specimen for characteristic evaluation at a cylinder temperature of 330° C. and a die temperature of 100° C. The obtained specimen was allowed to stand in a constant temperature and humidity chamber adjusted to a temperature of 23° C. and 50% RH for 24 hours, and then subjected to a characteristic evaluation test. The obtained molded article had high electrical insulation properties.

Examples 8 to 10, 12

Step I: Step of Attaching a Sizing Agent to a Carbon Fiber

A sizing agent coated carbon fiber was obtained in the same manner as in Example 7, except that the carbon fiber, the sizing agent, and the heat treatment conditions were as shown in Table 4. Then, the sizing agent remaining after the elution of acetone was measured.

Step II: Step of Producing Long-Fiber Pellets

Step III: Injection Molding Step

Long-fiber pellets were produced, molded, and evaluated in the same manner as in Example 1. The obtained molded article had high electrical insulation properties.

Example 11

Step I: Step of Attaching a Sizing Agent to a Carbon Fiber

A sizing agent coated carbon fiber was obtained in the same manner as in Example 3. From the sizing agent coated carbon fiber wound around a bobbin, the carbon fiber was run at a speed of 1 m/min and wound up on the other bobbin. At this time, the bobbin was turned once in 1 minute, thereby providing the sizing agent coated carbon fiber with a twist of 1.0 turn/m.

Step II: Step of Producing Long-Fiber Pellets

Step III: Injection Molding Step

Long-fiber pellets were produced, molded, and evaluated in the same manner as in Example 7. The electrical insulation properties of the obtained formed article were slightly lower than in Example 9, but still high.

Example 13

Step I: Step of Attaching a Sizing Agent to a Carbon Fiber

A sizing agent coated carbon fiber was obtained in the same manner as in Example 7, except that the carbon fiber, the sizing agent, and the heat treatment conditions were as shown in Table 4. Then, the sizing agent remaining after the elution of acetone was measured.

Step II: Step of Producing Long-Fiber Pellets

The impregnation aid (H-1) prepared in Reference Example 1 was melted in a melting bath at 240° C. and supplied to a kiss coater using a gear pump. The impregnation aid (H-1) was applied from the kiss coater onto a roll heated to 230° C. to form a coating film. Over the roll, the sizing agent coated carbon fiber was passed in contact with the roll, thereby attaching a certain amount of impregnation aid (H-1) per unit length of the sizing agent coated carbon fiber.

The sizing agent coated carbon fiber having attached thereto the impregnation aid (H-1) was supplied into a furnace heated to 350° C. The fiber was passed between ten rolls (50 mm (1)) freely rotating through bearings and disposed up and down alternately on a straight line, and also passed through ten roll bars (200 mmφ) installed in a zigzag fashion in the furnace. While sufficiently impregnating the sizing agent coated carbon fiber the impregnation aid (H-1) in this manner, PAS was converted into a high polymer. Next, air was blown to cool the carbon fiber strand taken from the furnace, and then wound up by a drum winder.

Subsequently, a PPS resin was melted at 360° C. in a single-screw extruder and extruded into the crosshead die installed to the end of the extruder. At the same time, the sizing agent coated carbon fiber impregnated with the impregnation aid (H-1) was also continuously supplied into the crosshead die (speed: 30 m/min). Asa result, the sizing agent coated carbon fiber impregnated with the impregnation aid (H-1) was covered with the molten PPS resin. Next, after cooling, the fiber was cut to 7 mm in the direction perpendicular to the pulling direction, thereby giving long-fiber pellets having a sheath-core structure, in which the carbon fiber was arranged nearly parallel to the axial direction, and the length of the carbon fiber was substantially the same as the length of the molding material. The supply of the PPS resin pellets was adjusted so that the amount of sizing agent coated carbon fiber was 20 mass % relative to the total.

Step III: Injection Molding Step

Long-fiber pellets were produced, molded, and evaluated in the same manner as in Example 1. The obtained molded article had high electrical insulation properties.

TABLE 4

|  |  |  | Example 7 | Example 8 | Example 9 | Example 10 | Example 11 | Example 12 | Example 13 |
|---|---|---|---|---|---|---|---|---|---|
| Carbon Fiber |  |  | Carbon Fiber A | Carbon Fiber A | Carbon Fiber B | Carbon Fiber C | Carbon Fiber B | Carbon Fiber B | Carbon Fiber A |
| Sizing agent remaining after the elution of acetone (part by mass*) |  |  | 0.15 | 0.16 | 0.18 | 0.19 | 0.18 | 0.18 | 0.15 |
| Sizing agent | Component (A) | (A-1) (part by mass) | 10 | 90 |  |  |  |  | 10 |
|  | Component (B) | (B-1) (part by mass) |  |  | 50 |  | 50 | 35 |  |

TABLE 4-continued

|  |  |  | Example 7 | Example 8 | Example 9 | Example 10 | Example 11 | Example 12 | Example 13 |
|---|---|---|---|---|---|---|---|---|---|
|  | Component (C) | (C-1) (part by mass) |  | 10 |  | 10 |  |  |  |
|  |  | (C-2) (part by mass) | 90 |  | 50 | 90 | 50 | 50 | 90 |
|  | Additional | (D-1) (part by mass) |  |  |  |  |  | 15 |  |
|  | component | (D-2) (part by mass) |  |  |  |  |  |  |  |
|  | (A) + (B) + (C) (mass %) |  | 100 | 100 | 100 | 100 | 100 | 85 | 100 |
| Heat | Temperature (° C.) |  | 245 | 280 | 245 | 245 | 245 | 245 | 245 |
| treatment | Time (sec) |  | 70 | 70 | 70 | 70 | 70 | 70 | 70 |
| Composite | Thermoplastic resin |  | PPS | PPS | PPS | PPS | PPS | PPS | PPS |
|  | Impregnation aid |  | — | — | — | — | — | — | (H-1) |
|  | Form |  | Long fiber | Long fiber | Long fiber | Long fiber | Long fiber | Long fiber | Long fiber |
|  | Carbon fiber content (mass %) |  | 20 | 20 | 20 | 20 | 20 | 20 | 20 |
| Twist [turn/m] |  |  | 0 | 0 | 0 | 0 | 1.0 | 0 | 0 |
| Electrical insulation properties |  |  | B | B | A | A | B | B | B |

*"Sizing agent remaining after the elution of acetone" is the number of parts by mass per 100 parts by mass of sizing agent coated carbon fiber.

Comparative Example 8

Step I: Step of Attaching a Sizing Agent to a Carbon Fiber

A sizing agent coated carbon fiber was obtained in the same manner as in Example 7, except that 60 parts by mass of (C-1) was used as a component (C), and 40 parts by mass of (D-1) was used as an additional component. Then, the sizing agent remaining after the elution of acetone was measured.

Step II: Step of Producing Long-Fiber Pellets

Step III: Injection Molding Step

Long-fiber pellets were produced, molded, and evaluated in the same manner as in Example 7. The electrical insulation properties of the obtained formed article were insufficient.

Comparative Example 9

Step I: Step of Attaching a Sizing Agent to a Carbon Fiber

A sizing agent coated carbon fiber was obtained in the same manner as in Example 7, except that 100 parts by mass of (D-1) was used as an additional component, and the carbon fiber B was used. Then, the sizing agent remaining after the elution of acetone was measured.

Step II: Step of Producing Long-Fiber Pellets

Step III: Injection Molding Step

Long-fiber pellets were produced, molded, and evaluated in the same manner as in Example 7. The electrical insulation properties of the obtained formed article were insufficient.

Comparative Example 10

Step I: Step of Attaching a Sizing Agent to a Carbon Fiber

A sizing agent coated carbon fiber was obtained in the same manner as in Example 7, except that 100 parts by mass of (D-1) was used as an additional component, and the carbon fiber B was used. Then, the sizing agent remaining after the elution of acetone was measured.

Step II: Step of Producing Long-Fiber Pellets

Step III: Injection Molding Step

Long-fiber pellets were produced, molded, and evaluated in the same manner as in Example 7. The electrical insulation properties of the obtained formed article were insufficient.

Comparative Example 11

Step I: Step of Attaching a Sizing Agent to a Carbon Fiber

A sizing agent coated carbon fiber was obtained in the same manner as in Example 7, except that 10 parts by mass of (A-1) was used as a component (A), 90 parts by mass of (C-1) was used as a component (C), and the carbon fiber D was used. Then, the sizing agent remaining after the elution of acetone was measured.

Step II: Step of Producing Long-Fiber Pellets

Step III: Injection Molding Step

Long-fiber pellets were produced, molded, and evaluated in the same manner as in Example 1. The electrical insulation properties of the obtained formed article were insufficient.

Comparative Example 12

Step I: Step of Attaching a Sizing Agent to a Carbon Fiber

A sizing agent coated carbon fiber was obtained in the same manner as in Example 7, except that 10 parts by mass of (B-1) was used as a component (B), 90 parts by mass of (C-1) was used as a component (C), and the carbon fiber E was used. Then, the sizing agent remaining after the elution of acetone was measured.

Step II: Step of Producing Long-Fiber Pellets

Step III: Injection Molding Step

Long-fiber pellets were produced, molded, and evaluated in the same manner as in Example 1. The electrical insulation properties of the obtained formed article were insufficient.

Comparative Example 13

Step I: Step of Attaching a Sizing Agent to a Carbon Fiber

A sizing agent coated carbon fiber was obtained in the same manner as in Example 7, except that 10 parts by mass of (B-1) was used as a component (B), 90 parts by mass of (C-2) was used as a component (C), and the carbon fiber F was used. Then, the sizing agent remaining after the elution of acetone was measured.

Step II: Step of Producing Long-Fiber Pellets
Step III: Injection Molding Step

Long-fiber pellets were produced, molded, and evaluated in the same manner as in Example 1. The electrical insulation properties of the obtained formed article were insufficient.

Comparative Example 14

Step I: Step of Attaching a Sizing Agent to a Carbon Fiber

A sizing agent coated carbon fiber was obtained in the same manner as in Example 7, except that 90 parts by mass of (A-1) was used as a component (A), 10 parts by mass of (C-1) was used as a component (C), and the carbon fiber A was used. Then, the sizing agent remaining after the elution of acetone was measured.

Step II: Step of Producing Long-Fiber Pellets
Step III: Injection Molding Step

Long-fiber pellets were produced, molded, and evaluated in the same manner as in Example 7. The electrical insulation properties of the obtained formed article were insufficient.

320° C. and a rotation speed of 150 rpm, followed by degassing from a downstream vacuum vent. Using a weight feeder, the supply was adjusted so that the amount of PPS resin pellets was 80 parts by mass per 20 parts by mass of the sizing agent coated carbon fiber. The molten resin was discharged from the die opening (diameter: 5 mm), and the obtained strand was cooled and cut with a cutter to form a molding material in pellet form.

Step IV: Injection Molding Step:

Using an injection molding machine J350EIII manufactured by Japan Steel Works, Ltd., the molding material in pellet form obtained in the extrusion step was molded into a specimen for characteristic evaluation at a cylinder temperature of 330° C. and a die temperature of 80° C. The obtained specimen was allowed to stand in a constant temperature and humidity chamber controlled to a temperature of 23° C. and 50% RH for 24 hours, and then subjected to a characteristic evaluation test. Next, the obtained specimen for characteristic evaluation was evaluated according to the injection-molded article evaluation method described above. The obtained molded article had high electrical insulation properties.

TABLE 5

|  |  | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|
| Carbon Fiber |  | Carbon Fiber A | Carbon Fiber B | Carbon Fiber B | Carbon Fiber D | Carbon Fiber E | Carbon Fiber F | Carbon Fiber A |
| Sizing agent remaining after the elution of acetone (part by mass*) |  | 0.08 | 0.02 | 0.04 | 0.1 | 0.1 | 0.08 | 0.08 |
| Sizing agent | Component (A) (A-1) (part by mass) |  |  |  | 10 |  |  | 90 |
|  | Component (B) (B-1) (part by mass) |  |  |  |  | 10 | 10 |  |
|  | Component (C) (C-1) (part by mass) | 60 |  |  | 90 | 90 |  | 10 |
|  | (C-2) (part by mass) |  |  |  |  |  | 90 |  |
|  | Additional component (D-1) (part by mass) | 40 | 100 |  |  |  |  |  |
|  | (D-2) (part by mass) |  |  | 100 |  |  |  |  |
|  | (A) + (B) + (C) (mass %) | 60 | 0 | 0 | 100 | 100 | 100 | 100 |
| Heat treatment | Temperature (° C.) | 245 | 245 | 245 | 245 | 245 | 245 | 230 |
|  | Time (sec) | 70 | 70 | 70 | 70 | 70 | 70 | 40 |
| Composite | Thermoplastic resin | PPS | PPS | PPS | PPS | PPS | PPS | PPS |
|  | Impregnation aid | — | — | — | — | — | — | — |
|  | Form | Long fiber | Long fiber | Long fiber | Long fiber | Long fiber | Long fiber | Long fiber |
|  | Carbon fiber content (mass %) | 20 | 20 | 20 | 20 | 20 | 20 | 20 |
| Twist [turn/m] |  | 0 | 0 | 0 | 0 | 0 | 0 | 0 |
| Electrical insulation properties |  | D | D | C | D | D | D | D |

* "Sizing agent remaining after the elution of acetone" is the number of parts by mass per 100 parts by mass of sizing agent coated carbon fiber.

Example 14

Step I: Step of Attaching a Sizing Agent to a Carbon Fiber

A sizing agent coated carbon fiber was obtained in the same manner as in Example 1, and the sizing agent remaining after the elution of acetone was measured.

Step II: Step of Cutting a Sizing Agent Coated Carbon Fiber

The sizing agent coated carbon fiber obtained in the step I was cut to ¼ inch using a cartridge cutter.

Step III: Extrusion Step

Using a twin-screw extruder TEX-30α (screw diameter: 30 mm, L/D=32) manufactured by Japan Steel Works, Ltd., PPS resin pellets were supplied from a main hopper, and then, from a downstream side hopper, the sizing agent coated carbon fiber cut in the previous step was supplied. They were sufficiently kneaded at a barrel temperature of Comparative Example 15

Step I: Step of Attaching a Sizing Agent to a Carbon Fiber

A sizing agent coated carbon fiber was obtained in the same manner as in Comparative Example 8.

Step II: Step of Producing Long-Fiber Pellets
Step III: Injection Molding Step

Short-fiber pellets were produced, molded, and evaluated in the same manner as in Example 14. The electrical insulation properties of the obtained formed article were insufficient.

Comparative Example 16

Step I: Step of Attaching a Sizing Agent to a Carbon Fiber

A sizing agent coated carbon fiber was obtained in the same manner as in Comparative Example 9.

Step II: Step of Producing Long-Fiber Pellets
Step III: Injection Molding Step

Short-fiber pellets were produced, molded, and evaluated in the same manner as in Example 14. The electrical insulation properties of the obtained formed article were insufficient.

Comparative Example 17

Step I: Step of Attaching a Sizing Agent to a Carbon Fiber

A sizing agent coated carbon fiber was obtained in the same manner as in Comparative Example 10.

Step II: Step of Producing Long-Fiber Pellets
Step III: Injection Molding Step

Short-fiber pellets were produced, molded, and evaluated in the same manner as in Example 14. The electrical insulation properties of the obtained formed article were insufficient.

TABLE 7

|  |  | Thermosetting resin A | Thermosetting resin B |
|---|---|---|---|
| Thermosetting resin component (part by mass) | (E-1) | 80 | 80 |
|  | (E-2) | 20 | 20 |
| Thermoplastic resin component (part by mass) | (G-1) | 10 | 10 |
| Additive component (part by mass) | (I-1) |  | 50 |
| Curing agent (part by mass) | (F-1) | 40 | 40 |

Example 15

Step I: Step of Attaching a Sizing Agent to a Carbon Fiber

An acetone solution containing 10 parts by mass of (A-1) as a component (A) and 90 parts by mass of (C-2) as a component (C) was prepared. The carbon fiber A was coated

TABLE 6

|  |  | Example 14 | Comparative Example 15 | Comparative Example 16 | Comparative Example 17 |
|---|---|---|---|---|---|
| Carbon Fiber |  | Carbon Fiber A | Carbon Fiber A | Carbon Fiber B | Carbon Fiber D |
| Sizing agent remaining after the elution of acetone (part by mass*) |  | 0.15 | 0.08 | 0.02 | 0.1 |
| Sizing agent | Component (A) (A-1) (part by mass) | 10 |  |  | 10 |
|  | Component (B) (B-1) (part by mass) |  |  |  |  |
|  | Component (C) (C-1) (part by mass) |  | 60 |  |  |
|  | (C-2) (part by mass) | 90 |  |  | 90 |
|  | Additional (D-1) (part by mass) |  | 40 |  |  |
|  | component (D-2) (part by mass) |  |  | 100 |  |
|  | (A) + (B) + (C) (mass %) | 100 | 60 | 0 | 100 |
| Heat treatment | Temperature (° C.) | 245 | 245 | 245 | 245 |
|  | Time (sec) | 70 | 70 | 70 | 70 |
| Composite | Thermoplastic resin | PPS | PPS | PPS | PPS |
|  | Impregnation aid | — | — | — | — |
|  | Form | Short fiber | Short fiber | Short fiber | Short fiber |
|  | Carbon fiber content (mass %) | 20 | 20 | 20 | 20 |
| Twist [turn/m] |  | 0 | 0 | 0 | 0 |
| Electrical insulation properties |  | A | C | D | C |

*"Sizing agent remaining after the elution of acetone" is the number of parts by mass per 100 parts by mass of sizing agent coated carbon fiber.

Reference Example 4

A primary resin serving as a raw material was produced as follows.

80 parts by mass of (E-1), 20 parts by mass of (E-2), and 10 parts by mass of (G-1) were blended in a kneading device and kneaded with heating to give a transparent viscous liquid. The viscous liquid was cooled to 100° C. or less, and then 40 parts by mass of (F-1) as a curing agent was kneaded, thereby producing a thermosetting resin A for a carbon fiber reinforced composite material.

Reference Example 5

A secondary resin serving as a raw material was produced as follows.

80 parts by mass of (E-1), 20 parts by mass of (E-2), and 10 parts by mass of (G-3) were blended in a kneading device and kneaded with heating to give a transparent viscous liquid. The viscous liquid was cooled to 100° C. or less, and thermoplastic resin particles (I-1) were added in the predetermined amount shown in Table 2. Subsequently, 40 parts by mass of (F-1) as a curing agent was kneaded, thereby producing a thermosetting resin B for a carbon fiber reinforced composite material.

with this sizing agent by an immersion method and then heat-treated at a temperature of 245° C. for 70 seconds, thereby giving a sizing agent coated carbon fiber (a). The amount of sizing agent attached was adjusted to 1.0 mass % relative to the sizing agent coated carbon fiber (a). Subsequently, the remaining sizing agent after the elution of acetone was measured. The results are summarized in Table 8.

Step II: Production, Molding, and Evaluation of a Prepreg

A release paper was coated with the thermosetting resin A using a knife coater to a resin areal weight of 30 g/m$^2$, thereby producing a resin film. The resin film was placed on each side of the sizing agent coated carbon fiber (a) (areal weight: 190 g/m$^2$) of the step I aligned in one direction. Then, with heating and pressurizing using a heat roller, the sizing agent coated carbon fiber (a) was impregnated with the thermosetting resin, thereby giving a primary prepreg. Next, a release paper was coated with the thermosetting resin B to a resin areal weight of 20 g/m$^2$, thereby producing two secondary resin films. The primary prepreg was passed between the secondary resin films placed to face each other, and then, with heating and pressurizing, a secondary prepreg was obtained.

A carbon fiber reinforced composite material produced using the obtained secondary prepreg had high volume-specific resistance. In addition, the Vf of the carbon fiber-resin composite material was 66%. The results are summarized in Table 3.

Example 16

Step I: Step of attaching a Sizing Agent to a Carbon Fiber
A sizing agent coated carbon fiber (a) was obtained in the same manner as in Example 15, and the sizing agent remaining after the elution of acetone was measured.
Step II: Production, Molding, and Evaluation of a Prepreg
Next, a prepreg was produced, molded, and evaluated in the same manner as in Example 1, except that a release paper was coated with the thermosetting resin B to a resin areal weight of 10 g/m². The volume-specific resistance of the carbon fiber reinforced composite material produced using the obtained secondary prepreg was high. In addition, the Vf of the carbon fiber-resin composite material was 69%. The results are summarized in Table 8.

Example 17

Step I: Step of Attaching a sizing Agent to a Carbon Fiber
A sizing agent coated carbon fiber (a) was obtained in the same manner as in Example 15, and the sizing agent remaining after the elution of acetone was measured.
Step II: Production, Molding, and Evaluation of a Prepreg
Next, a prepreg was produced, molded, and evaluated in the same manner as in Example 15, except that a release paper was coated with the thermosetting resin B to a resin areal weight of 30 g/m². The volume-specific resistance of the carbon fiber reinforced composite material produced using the obtained secondary prepreg was high. In addition, the Vf of the carbon fiber-resin composite material was 63%. The results are summarized in Table 8.

Examples 18 to 21

Step I: Step of Attaching a Sizing Agent to a Carbon Fiber
A sizing agent coated carbon fiber (a) was obtained in the same manner as in Example 15, except that the carbon fiber, the sizing agent, and the heat treatment conditions were as shown in Table 8. Then, the sizing agent remaining after the elution of acetone was measured.
Step II: Production, Molding, and Evaluation of a Prepreg
A prepreg was produced, molded, and evaluated in the same manner as in Example 1. The obtained carbon fiber-resin composite material had high electrical insulation properties. The results are summarized in Table 8.

TABLE 8

| | | | Example 15 | Example 16 | Example 17 | Example 18 | Example 19 | Example 20 | Example 21 |
|---|---|---|---|---|---|---|---|---|---|
| Carbon Fiber | | | Carbon Fiber A | Carbon Fiber A | Carbon Fiber A | Carbon Fiber A | Carbon Fiber B | Carbon Fiber C | Carbon Fiber B |
| Sizing agent remaining after the elution of acetone (part by mass*) | | | 0.15 | 0.15 | 0.15 | 0.16 | 0.18 | 0.19 | 0.18 |
| Sizing agent | Component (A) | (A-1) (part by mass) | 10 | 10 | 10 | 90 | | | |
| | Component (B) | (B-1) (part by mass) | | | | | 50 | | 35 |
| | Component (C) | (C-1) (part by mass) | | | | 10 | | 10 | |
| | | (C-2) (part by mass) | 90 | 90 | 90 | | 50 | 90 | 50 |
| | Additional component | (D-1) (part by mass) | | | | | | | |
| | | (D-2) (part by mass) | | | | | | | 15 |
| | (A) + (B) + (C) (mass %) | | 100 | 100 | 100 | 100 | 100 | 100 | 85 |
| Heat treatment | Temperature (° C.) | | 245 | 245 | 245 | 280 | 245 | 245 | 245 |
| | Time (sec) | | 70 | 70 | 70 | 70 | 70 | 70 | 70 |
| Matrix resin | Primary prepreg | | Thermosetting resin A | Thermosetting resin A | Thermosetting resin A | Thermosetting resin A | Thermosetting resin A | Thermosetting resin A | Thermosetting resin A |
| | | Resin areal weight (g/m²) | 30 | 30 | 30 | 30 | 30 | 30 | 30 |
| | Secondary prepreg | | Thermosetting resin B | Thermosetting resin B | Thermosetting resin B | Thermosetting resin B | Thermosetting resin B | Thermosetting resin B | Thermosetting resin B |
| | | Resin areal weight (g/m²) | 20 | 10 | 30 | 20 | 20 | 20 | 20 |
| | | Proportion of (I-1) relative to the entire resin (mass %) | 10 | 6 | 12 | 10 | 10 | 10 | 10 |
| Carbon fiber volume fraction (%) | | | 66 | 69 | 63 | 66 | 66 | 66 | 66 |
| T1/T2 | | | 7 | 8 | 5 | 7 | 7 | 7 | 7 |
| Electrical insulation properties | | | B | C | A | B | A | A | B |

*"Sizing agent remaining after the elution of acetone" is the number of parts by mass per 100 parts by mass of sizing agent coated carbon fiber.

Example 22

Step I: Step of attaching a Sizing Agent to a Carbon Fiber
A sizing agent coated carbon fiber (a) was obtained in the same manner as in Example 15, and the sizing agent remaining after the elution of acetone was measured.
Step II: Production, Molding, and Evaluation of a Prepreg
A release paper was coated with the thermosetting resin A using a knife coater to a resin areal weight of 30 g/m², thereby producing a resin film. The resin film was placed on each side of the sizing agent coated carbon fiber (a) (areal weight: 190 g/m²) of the step I aligned in one direction. Then, with heating and pressurizing using a heat roller, the sizing agent coated carbon fiber (a) was impregnated with the thermosetting resin, thereby giving a primary prepreg. Next, the primary prepreg was passed between resin films of a thermosetting resin A having a resin areal weight of 20 g/m² placed to face each other, and then, with heating and pressurizing, a secondary prepreg was obtained. The volume-specific resistance of the carbon fiber reinforced composite material produced using the obtained secondary prepreg was satisfactory. In addition, the Vf of the carbon fiber-resin composite material was 66%. The results are summarized in Table 9.

Example 23

Step I: Step of Attaching a Sizing Agent to a Carbon Fiber

A sizing agent coated carbon fiber (a) was obtained in the same manner as in Example 1, and the sizing agent remaining after the elution of acetone was measured.

Step II: Production, Molding, and Evaluation of a Prepreg

Next, a prepreg was produced, molded, and evaluated in the same manner as in Example 15, except that a release paper was coated with the thermosetting resin B to a resin areal weight of 5 g/m². The volume-specific resistance of the carbon fiber reinforced composite material produced using the obtained secondary prepreg was satisfactory. In addition, the Vf of the carbon fiber-resin composite material was 72%. The results are summarized in Table 9.

Comparative Example 18

Step I: Step of Attaching a Sizing Agent to a Carbon Fiber

A sizing agent coated carbon fiber (a) was obtained in the same manner as in Example 1, except that 60 parts by mass of (C-1) was used as a component (C), and 40 parts by mass of (D-1) was used as an additional component. Then, the sizing agent remaining after the elution of acetone was measured.

Step II: Production, Molding, and Evaluation of a Prepreg

A prepreg was produced, molded, and evaluated in the same manner as in Example 15. The obtained carbon fiber-resin composite material had low electrical insulation properties. The results are summarized in Table 9.

Comparative Example 19

Step I: Step of Attaching a Sizing Agent to a Carbon Fiber

A sizing agent coated carbon fiber (a) was obtained in the same manner as in Example 1, except that 100 parts by mass of (D-1) was used as an additional component, and the carbon fiber B was used. Then, the sizing agent remaining after the elution of acetone was measured.

Step II: Production, Molding, and Evaluation of a Prepreg

A prepreg was produced, molded, and evaluated in the same manner as in Example 15. The obtained carbon fiber-resin composite material had low electrical insulation properties. The results are summarized in Table 9.

Comparative Example 20

Step I: Step of Attaching a Sizing Agent to a Carbon Fiber

A sizing agent coated carbon fiber (a) was obtained in the same manner as in Example 15, except that 100 parts by mass of (D-2) was used as an additional component, and the carbon fiber B was used. Then, the sizing agent remaining after the elution of acetone was measured.

Step II: Production, Molding, and Evaluation of a Prepreg

A prepreg was produced, molded, and evaluated in the same manner as in Example 1. The obtained carbon fiber-resin composite material had low electrical insulation properties. The results are summarized in Table 9.

Comparative Example 21

Step I: Step of Attaching a Sizing Aagent to a Carbon Fiber

A sizing agent coated carbon fiber (a) was obtained in the same manner as in Example 15, except that 10 parts by mass of (A-1) was used as a component (A), 90 parts by mass of (C-1) was used as a component (C), and the carbon fiber D was used. Then, the sizing agent remaining after the elution of acetone was measured.

Step II: Production, Molding, and Evaluation of a Prepreg

A prepreg was produced, molded, and evaluated in the same manner as in Example 15. The obtained carbon fiber-resin composite material had low electrical insulation properties. The results are summarized in Table 9.

Comparative Example 22

Step I: Step of Attaching a Sizing Agent to a Carbon Fiber

A sizing agent coated carbon fiber (a) was obtained in the same manner as in Example 1, except that 10 parts by mass of (B-1) was used as a component (B), 90 parts by mass of (C-1) was used as a component (C), and the carbon fiber E was used. Then, the sizing agent remaining after the elution of acetone was measured.

Step II: Production, Molding, and Evaluation of a Prepreg

A prepreg was produced, molded, and evaluated in the same manner as in Example 15. The obtained carbon fiber-resin composite material had low electrical insulation properties. The results are summarized in Table 9.

Comparative Example 23

Step I: Step of Attaching a Sizing Agent to a Carbon Fiber

A sizing agent coated carbon fiber (a) was obtained in the same manner as in Example 15, except that 10 parts by mass of (B-1) was used as a component (B), 90 parts by mass of (C-2) was used as a component (C), and the carbon fiber F was used. Then, the sizing agent remaining after the elution of acetone was measured.

Step II: Production, Molding, and Evaluation of a Prepreg

A prepreg was produced, molded, and evaluated in the same manner as in Example 15. The obtained carbon fiber-resin composite material had low electrical insulation properties. The results are summarized in Table 9.

Comparative Example 24

Step I: Step of Attaching a Sizing Agent to a Carbon Fiber

A sizing agent coated carbon fiber (a) was obtained in the same manner as in Example 1, except that the carbon fiber A was coated with a sizing agent by an immersion method and then heat-treated at a temperature of 180° C. for 40 seconds. Then, the sizing agent remaining after the elution of acetone was measured.

Step II: Production, Molding, and Evaluation of a Prepreg

A prepreg was produced, molded, and evaluated in the same manner as in Example 1. The obtained carbon fiber-resin composite material had low electrical insulation properties. The results are summarized in Table 9.

TABLE 9

| | | | Example 22 | Example 23 | Comparative Example 18 | Comparative Example 19 | Comparative Example 20 |
|---|---|---|---|---|---|---|---|
| Carbon Fiber | | | Carbon Fiber A | Carbon Fiber A | Carbon Fiber A | Carbon Fiber B | Carbon Fiber B |
| Sizing agent remaining after the elution of acetone (part by mass*) | | | 0.15 | 0.15 | 0.08 | 0.02 | 0.04 |
| Sizing agent | Component (A) | (A-1) (part by mass) | 10 | 10 | | | |
| | Component (B) | (B-1) (part by mass) | | | | | |
| | Component (C) | (C-1) (part by mass) | | | 60 | | |
| | | (C-2) (part by mass) | 90 | 90 | | | |
| | Additional component | (D-1) (part by mass) | | | 40 | 100 | |
| | | (D-2) (part by mass) | | | | | 100 |
| | (A) + (B) + (C) (mass %) | | 100 | 100 | 60 | | |
| Heat treatment | Temperature (° C.) | | 245 | 245 | 245 | 245 | 245 |
| | Time (sec) | | 70 | 70 | 70 | 70 | 70 |
| Matrix resin | Primary prepreg | | Thermosetting resin A | Thermosetting resin A | Thermosetting resin A | Thermosetting resin A | Thermosetting resin A |
| | | Resin areal weight (g/m$^2$) | 30 | 30 | 30 | 30 | 30 |
| | Secondary prepreg | | Thermosetting resin A | Thermosetting resin B | Thermosetting resin B | Thermosetting resin B | Thermosetting resin B |
| | | Resin areal weight (g/m$^2$) | 20 | 5 | 20 | 20 | 20 |
| | Proportion of (I-1) relative to the entire resin (mass %) | | 0 | 3 | 10 | 10 | 10 |
| Carbon fiber volume fraction (%) | | | 66 | 72 | 66 | 66 | 66 |
| T1/T2 | | | 12 | 10 | 7 | 7 | 7 |
| Electrical insulation properties | | | D | D | E | E | E |

| | | | Comparative Example 21 | Comparative Example 22 | Comparative Example 23 | Comparative Example 24 |
|---|---|---|---|---|---|---|
| Carbon Fiber | | | Carbon Fiber D | Carbon Fiber E | Carbon Fiber F | Carbon Fiber A |
| Sizing agent remaining after the elution of acetone (part by mass*) | | | 0.1 | 0.1 | 0.08 | 0.05 |
| Sizing agent | Component (A) | (A-1) (part by mass) | 10 | | | 90 |
| | Component (B) | (B-1) (part by mass) | | 10 | 10 | |
| | Component (C) | (C-1) (part by mass) | 90 | 90 | | 10 |
| | | (C-2) (part by mass) | | | 90 | |
| | Additional component | (D-1) (part by mass) | | | | |
| | | (D-2) (part by mass) | | | | |
| | (A) + (B) + (C) (mass %) | | 100 | 100 | 100 | 100 |
| Heat treatment | Temperature (° C.) | | 245 | 245 | 245 | 180 |
| | Time (sec) | | 70 | 70 | 70 | 40 |
| Matrix resin | Primary prepreg | | Thermosetting resin A | Thermosetting resin A | Thermosetting resin A | Thermosetting resin A |
| | | Resin areal weight (g/m$^2$) | 30 | 30 | 30 | 30 |
| | Secondary prepreg | | Thermosetting resin B | Thermosetting resin B | Thermosetting resin B | Thermosetting resin B |
| | | Resin areal weight (g/m$^2$) | 20 | 20 | 20 | 20 |
| | Proportion of (I-1) relative to the entire resin (mass %) | | 10 | 10 | 10 | 10 |
| Carbon fiber volume fraction (%) | | | 66 | 66 | 66 | 66 |
| T1/T2 | | | 7 | 7 | 7 | 7 |
| Electrical insulation properties | | | E | E | E | E |

*"Sizing agent remaining after the elution of acetone" is the number of parts by mass per 100 parts by mass of sizing agent coated carbon fiber.

INDUSTRIAL APPLICABILITY

The sizing agent coated carbon fiber and the method for producing a sizing agent coated carbon fiber of the present invention have excellent electrical insulation properties, and thus are suitable for processing into a woven fabric or a prepreg. In addition, the prepreg and the carbon fiber reinforced composite material of the present invention are lightweight and also have excellent electrical insulation properties. Therefore, they are suitable for use in a large number of fields including electrical/electronic parts, as well as airplane components, spacecraft components, automobile components, ship components, civil engineering and construction materials, sporting goods, and the like.

DESCRIPTION OF REFERENCE SIGNS

1: Molding material
1A: Molding material
2: Carbon fiber
3: Matrix resin
4: Impregnation aid

The invention claimed is:

1. A sizing agent coated carbon fiber comprising a carbon fiber coated with a sizing agent, wherein
   the sizing agent coated carbon fiber has a volume-specific resistance of 300 Ωcm or more,
   the carbon fiber is polyacrylonitrile-based,
   upon subjecting the carbon fiber cross-section to energy-dispersive X-ray spectroscopy, a high oxygen concentration layer is detected wherein
      the proportion of oxygen relative to the total of all elements is 4% or more in a thickness of 10 nm or more and 30 nm or less from the carbon fiber surface, and
      the proportion of oxygen relative to the total of all elements is less than 4% below the high oxygen concentration layer,
   the sizing agent contains (A) to (C) in a total amount of 80 mass % or more relative to the total amount of the sizing agent,
   upon subjecting the sizing agent coated carbon fiber to a 10-minute ultrasonic treatment in an acetone solvent three times, the amount of non-eluted sizing agent remaining on the carbon fiber is 0.1 parts by mass or more and 0.25 parts by mass or less per 100 parts by mass of the sizing agent coated carbon fiber, wherein (A), (B) and (C) are as follows:
   (A) at least one member selected from the group consisting of polyimide, polyetherimide, and polysulfone,
   (B) a compound having a terminal unsaturated group and a polar group in a molecule, and
   (C) a polyether-type aliphatic epoxy compound and/or polyol-type aliphatic epoxy compound having an epoxy equivalent of 250 g/eq. or less and having two or more epoxy groups in a molecule, and
   wherein the ratio (β)/(α) between the following (α) and (β) is 0.8 or more as determined by X-ray photoelectron spectroscopy using AlK$\alpha_{1,2}$:
   (α): surface oxygen concentration (O/C) that is the ratio of the number of atoms of oxygen (O) to that of carbon (C) on the carbon fiber surface measured at a photoelectron take-off angle of 10°, and
   (β): surface oxygen concentration (O/C) that is the ratio of the number of atoms of oxygen (O) to that of carbon (C) on the carbon fiber surface measured at a photoelectron take-off angle of 90°.

2. The sizing agent coated carbon fiber according to claim 1, wherein the polyether-type aliphatic epoxy compound and/or polyol-type aliphatic epoxy compound (C) is a glycidyl-ether-type epoxy compound obtained by the reaction of at least one member selected from the group consisting of glycerol, diglycerol, polyglycerol, trimethylolpropane, pentaerythritol, sorbitol, and arabitol with epichlorohydrin.

3. The sizing agent coated carbon fiber according to claim 1, wherein the sizing agent coated carbon fiber has a single-yarn fineness of 0.5 dtex or less.

4. The sizing agent coated carbon fiber according to claim 1, wherein the twist of the sizing agent coated carbon fiber is not more than 1 turn meter.

5. A method for producing a sizing agent coated carbon fiber according to claim 1, wherein the method comprises coating a carbon fiber with a sizing agent, followed by a heat treatment at 240° C. or more for 60 to 3,000 seconds.

6. The method for producing a sizing agent coated carbon fiber according to claim 5, wherein the carbon fiber is subjected to liquid-phase electrolytic oxidation at a current density of 5 A/m$^2$ or less.

7. The method for producing a sizing agent coated carbon fiber according to claim 6, wherein the liquid-phase electrolytic oxidation is performed at 40° C. or more.

8. A prepreg obtainable by impregnating the sizing agent coated carbon fiber according to claim 1 with a thermosetting resin.

9. A carbon fiber reinforced composite material obtainable by curing the prepreg according to claim 8.

10. A carbon fiber reinforced resin composition comprising:
   the sizing agent coated carbon fiber according to claim 1; and
   a matrix resin including a thermoplastic resin or a radically polymerizable resin.

11. The carbon fiber reinforced resin composition according to claim 10, wherein the matrix resin is at least one member selected from a polyimide resin, a polyetherimide resin, a polyarylene sulfide resin, a polycarbonate resin, a polyolefin resin, and a polyamide resin.

12. A method for producing a carbon fiber reinforced resin composition, comprising:
   a step of producing a sizing agent coated carbon fiber by the method according to claim 5; and
   a step of blending the sizing agent coated carbon fiber with a matrix resin.

13. A carbon fiber reinforced resin composition, comprising the carbon fiber reinforced resin composition according to claim 10 and being a molding material in any one of the following forms (D), (E), (F), and (G):
   molding material (D): a columnar molding material, in which the carbon fiber is arranged such that the difference in angle between the axial direction thereof and the major axis line of the molding material is 20° or less, the content of carbon fiber having a length of 50% or less of the length of the molding material is 30 mass % or less, and the average two-dimensional orientation angle defined by a single fiber of the carbon fiber forming the molding material and another single fiber of the carbon fiber closest thereto is 10 to 80°,
   molding material (E): a molding material, in which the carbon fiber is in the form of a single fiber and substantially two-dimensionally oriented, molding material (F): a molding material in which the carbon fiber is in the form of a bundle and substantially two-dimensionally oriented, molding material (G): a prepreg.

14. The carbon fiber reinforced resin molded article obtainable by molding the carbon fiber reinforced resin composition according to claim 13.

15. A laminated prepreg comprising:
    at least two plies of a carbon fiber layer (b) containing a sizing agent coated carbon fiber (a); and
    a layer of a polymer resin (c) disposed between the two plies,
    the laminated prepreg being configured such that
    (i) the sizing agent coated carbon fiber (a) is the sizing agent coated carbon fiber according to claim 1, and
    (ii) a composite material having an interlayer structure obtainable by solidifying the laminated prepreg has a volume-specific resistance of 500 Ω·m or more in the thickness direction of the laminated prepreg.

16. The laminated prepreg according to claim 15, wherein the ratio T1/T2 between the average thickness T1 of the carbon fiber layer (b) and the average thickness T2 of the layer of a polymer resin (c) in the composite material is 9 or less.

17. The laminated prepreg according to claim 15, wherein the layer of a polymer resin (c) contains a thermosetting resin and a curing agent in a total amount 50 parts by mass or more per 100 parts by mass of the polymer resin in the layer.

18. The laminated prepreg according to claim 15, wherein the layer of a polymer resin (c) contains at least one thermoplastic resin selected from the group consisting of particles, fibers, and a film of a thermoplastic resin.

19. The laminated prepreg according to claim 18, wherein the thermoplastic resin is contained in an amount of 5 to 30 mass % or more relative to the total amount of the polymer resin contained in the laminated prepreg.

20. The laminated prepreg according to claim 15, wherein the carbon fiber volume fraction in the composite material is 60 to 70%.

21. A method for producing a laminated prepreg, being a method for producing the laminated prepreg according to claim 15, wherein the sizing agent coated carbon fiber (a) is obtained through a step of coating a carbon fiber with a sizing agent, followed by a heat treatment at 240° C. or more for 60 to 3,000 seconds.

22. A method for producing a laminated prepreg, being a method for producing the laminated prepreg according to claim 15, wherein the sizing agent coated carbon fiber (a) is obtained through a step of coating a carbon fiber that has been subjected to liquid-phase electrolytic oxidation at a current density of 5 A/m$^2$ or less with a sizing agent.

23. A method for producing a laminated prepreg, being a method for producing the laminated prepreg according to claim 15, wherein the sizing agent coated carbon fiber (a) is obtained through a step of coating a carbon fiber that has been subjected to liquid-phase electrolytic oxidation at 40° C. or more with a sizing agent.

24. A method for producing a composite material having an interlayer structure, comprising a step of solidifying the laminated prepreg according to claim 15.

25. A method for producing a composite material having an interlayer structure, comprising, after obtaining a laminated prepreg by the method according to claim 21, a step of solidifying the laminated prepreg.

* * * * *